(12) United States Patent
Perlman

(10) Patent No.: US 6,829,779 B1
(45) Date of Patent: Dec. 7, 2004

(54) USER INTERFACE FOR ENTERTAINMENT SYSTEM SETUP

(75) Inventor: Stephen G. Perlman, Mountain View, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/154,605

(22) Filed: Sep. 16, 1998

Related U.S. Application Data

(63) Continuation-in-part of application No. 09/154,609, filed on Sep. 16, 1998.

(51) Int. Cl.$^7$ .......................... H04N 7/16; H04N 5/445; G09G 5/00; G06F 3/00; G06F 13/00
(52) U.S. Cl. .......................... 725/37; 725/139; 345/705
(58) Field of Search ................................ 348/734, 552, 348/706, 569; 725/37, 80, 133, 141, 153, 82, 85, 131, 60; 345/705, 706, 708, 709, 771, 839, 965; 434/307 R, 365; 705/1, 26, 27, 28, 29, 16; H04N 7/16, 5/445; G09G 5/00; G06F 3/00, 13/00

(56) References Cited

U.S. PATENT DOCUMENTS

| | | | | |
|---|---|---|---|---|
| 4,623,887 A | * | 11/1986 | Welles, II | 340/825.57 |
| 4,807,118 A | * | 2/1989 | Lin et al. | 709/237 |
| 4,989,081 A | * | 1/1991 | Miyagawa et al. | 348/61 |
| 5,351,130 A | * | 9/1994 | Dugan et al. | 348/725 |
| 5,617,220 A | * | 4/1997 | Ueno | 358/434 |
| 5,680,323 A | * | 10/1997 | Barnard | 345/720 |
| 5,883,621 A | * | 3/1999 | Iwamura | 725/37 |
| 5,936,667 A | * | 8/1999 | Saib et al. | 348/180 |
| 5,943,649 A | * | 8/1999 | Fado et al. | 704/270 |
| 6,008,836 A | * | 12/1999 | Bruck et al. | 725/131 |
| 6,038,625 A | * | 3/2000 | Ogino et al. | 710/104 |
| 6,057,874 A | * | 5/2000 | Michaud | 725/141 |
| 6,100,886 A | * | 8/2000 | Lin | 345/709 |
| 6,408,435 B1 | * | 6/2002 | Sato | 725/58 |

* cited by examiner

Primary Examiner—Chris Grant
Assistant Examiner—Andrew Y. Koenig
(74) Attorney, Agent, or Firm—Workman Nydegger

(57) ABSTRACT

Systems and methods for providing interactive instructions directing a user how to establish interactivity between multiple consumer electronics devices. A first consumer electronics device is connected to the television set. The user is requested to identify another consumer electronics device to be connected to the first consumer electronics device or to the television set. The first consumer electronics device identifies the cables needed to establish the connection and then determines whether the user has the cables. If the user does not have the cables, they may be purchased online by the first consumer electronics device. Connection instructions describing how to establish the connection are displayed on the television set. After the user attempts to establish the connection, the first consumer electronics device optionally tests the connection to determine whether it is reliable and fully operable. If not, further instructions are displayed. In addition, establishing the connection may include coupling a cable to one of several identical, interchangeable connectors at the first consumer electronics device. Furthermore, establishing connectivity can involve configuring a remote control system to control multiple consumer electronics devices.

6 Claims, 16 Drawing Sheets

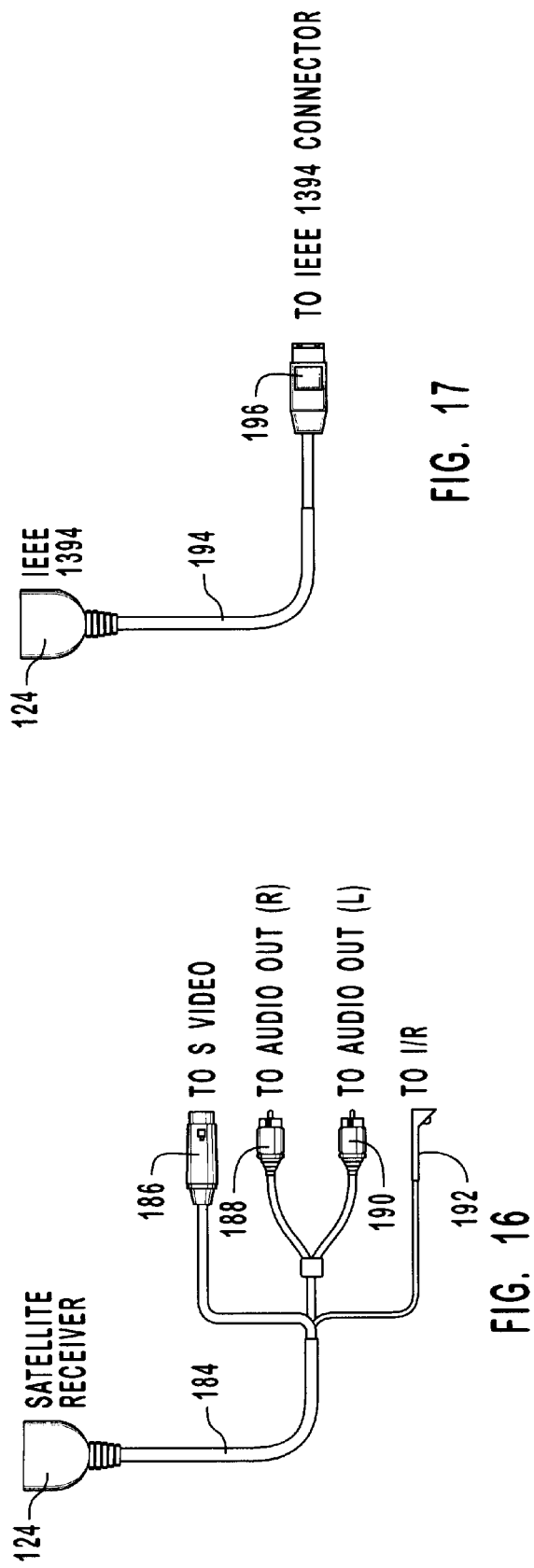

USER INTERFACE FOR ENTERTAINMENT SYSTEM SETUP

RELATED APPLICATIONS

This is a continuation-in-part application of co-pending U.S. patent application Ser. No. 09/154,609, filed Sep. 16, 1998, entitled "Configuration for Advanced Entertainment System Control," which is hereby incorporated by reference.

BACKGROUND OF THE INVENTION

1. The Field of the Invention

The present invention relates to systems and methods for interconnecting a plurality of consumer electronics devices. More specifically, the present invention is directed to systems and methods for delivering interactive instructions for setting up and connecting various consumer electronics devices and for testing the connections established by the user to ensure that they are reliable and fully operable.

2. The Prior State of the Art

Since its introduction, the television has provided a source of entertainment for millions of individuals. The television has traditionally been a fairly simple device that is easy for users to set up and connect. Traditionally, a user simply unboxed the television, connected the antenna, plugged the television in and turned it on.

Today, however, televisions have moved well beyond their traditional configurations and may form the center of a wide array of entertainment and information systems. For example, various consumer electronics devices, such as VCRs, video disk players, video game devices, and so forth, may be connected to a television to provide enhanced entertainment opportunities. In addition, recently there have been introduced a variety of inexpensive Internet terminal boxes which allow individuals to connect to the Internet to send and receive information. These Internet terminals use a television set as the display device. Furthermore, video programming may be received not only from traditional broadcast antennas, but also cable television services and satellite receivers. In order to give a high quality viewing experience, home theater systems that provide surround sound and near theater quality audio can also be connected.

Although consumers are now able to custom configure a wide variety of home entertainment and information systems using the various consumer electronic choices available today, connecting the devices together in order to realize the full benefit of the consumer electronics devices can be extremely difficult. In fact, various configurations can be so complicated, that users refuse to consider the purchase of additional consumer electronics devices simply because they cannot figure out how to connect them together. In order to provide high quality video and audio, the mechanisms for connecting these various consumer electronics devices to a television may vary dramatically from device to device. Connections may include not only coaxial cable, but also a variety of RCA-type connectors for audio and/or video, S-video connectors, and so forth. If the various video and audio standards of foreign countries are taken into account, the various configurations and connectors is extremely vast.

Part of the difficulty in connecting together various consumer electronics devices is the limited nature of instructions typically included with the devices. Traditionally, instruction manuals sold with consumer electronics devices have illustrations and accompanying text that describe a proper manner of interconnecting various consumer electronics devices. However, because any particular user may have one or more of a wide variety of devices, it is often very difficult for the consumer to make sense of instructions and identify the sections directed to his or her particular type of electronics equipment. In addition, once consumers have attempted to connect their consumer electronics devices as described in an instruction manual, it is often difficult to verify that the connections have been correctly established. If, for example, the consumer has come close to establishing the correct connection, the consumer electronics device may only partially function. In this case, the consumer may mistakenly believe that the device is operating with full functionality. Without a reliable way to test the connection to insure that it is fully established, consumers may find it difficult to properly configure consumer electronics systems.

In order to help illustrate the magnitude of the problem, reference will now be made to FIGS. 1–6 which show various potential configurations for how an Internet terminal, such as those that are commonly available today, may be connected to a television. Referring first to FIG. 1, the most basic configuration is illustrated. In FIG. 1, a low-cost Internet terminal is illustrated generally as 20. Such Internet terminals are typically specialized low-cost computer devices designed specifically to connect to the Internet and allow browsing and delivery of information from the Internet to the television screen. Such computers include the NC, licensed by Network Computer, Inc., the Sega Saturn (combined with the netlink accessory), by Sega Corporation, and the WebTV, by WebTV Networks, Inc. As illustrated in FIG. 1, such Internet terminals may have a plurality of various connectors on the back of the device that allow the device to be connected to the television and to the various other consumer electronics devices a user might have. In FIG. 1, such connectors are illustrated generally as 22.

In the most basic configuration, an Internet terminal is connected to the television without any other consumer electronics devices via traditional coaxial cable. In this configuration, illustrated in FIG. 1, coaxial cable 24 coming from an antenna or cable box is connected to an input connector 26. A second coaxial cable 28 is connected between Internet terminal 20 and television 30 as illustrated in FIG. 1. Additionally, power cord 32 and telephone cable 34 are connected to their respective connectors. Such a configuration would be used, for example, with an older style television which only had a VHF/UHF connector 36 as indicated.

In order to improve the video quality of information flowing from a consumer electronics device to a television, many newer televisions have direct audio and video inputs. Such a television is illustrated, for example, in FIG. 2. As illustrated in FIG. 2, Television 38 has not only VHF/UHF connector 36 but also a direct video input 40 and a direct audio input 42. Such connectors are usually configured to receive a standard RCA type connector. As indicated in FIG. 2, a standard RCA cable 44 is connected to video input 40, audio input 42 and corresponding video output 46 and audio output 48 on the Internet terminal. Since the television is configured only to accept mono audio signals, the second stereo audio output is not utilized.

Turning next to FIG. 3, yet a different type of television having different connectors is illustrated. In this figure, television 50 has not only video inputs 40 but also S-video input 52 and stereo audio inputs 54 and 56. S-video is yet another standard that has been developed in order to provide crisper, higher quality video signals to televisions. Thus, it is desirable to use S-video whenever possible. In FIG. 3, therefore, rather than using video input 40, S-video cable 58 is connected between S-video input 52 and S-video output 60 of Internet terminal 20. Left channel audio input 54 is then connected to left channel audio output connector 48 of Internet terminal 20, and right channel audio input 56 is connected to right channel audio output 62 of Internet terminal 20 in order to provide stereo sound between Internet terminal 20 and television 50. If, for some reason, the user did not desire to use the S-video input, then television 50 may be connected to Internet 2 terminal 20 as illustrated in FIG. 4 by using RCA cable 44 to connect video output 46 to 3 video input 40.

FIGS. 1–4 illustrate the complexity that can occur when connecting a consumer electronics device to a television. These situations illustrate only a single consumer electronics device, represented by Internet terminal 20. Such a consumer electronics device is, however, simply representative since identical events happen whenever any type of consumer electronics device is connected to a television. When multiple consumer electronics devices are connected to a television, the situation becomes even more confusing. One such configuration is illustrated in FIG. 5 where the video programming is provided by a cable television service. The consumer also has both an Internet terminal and a VCR that he desires to connect to a television. Given these choices, FIG. 5 represents one possible configuration that a user might be required to connect.

In FIG. 5, video programming is delivered to the user through coaxial cable 24. When video programming is delivered from a cable television service, usually some, and occasionally all, of the channels are scrambled or otherwise encoded to discourage piracy. Cable television services thus, typically require a user to have a cable box 64 to decode these channels. Coaxial cable 24 is therefore connected to input connector 66. Output connector 68 is typically connected via coaxial cable 70 to the input connector 72 of VCR 74. Output connector 76 of VCR 74 is connected via coaxial cable 78 to input connector 26 of Internet terminal 20. Output connector 35 of Internet terminal 20 is connected via coaxial cable 28 to input connector 36 of television 50 as previously described. Internet terminal 20 is also connected to television 50 via RCA cable 44 as previously described in conjunction with FIG. 4. As far as the video connection goes, a user could, alternatively, connect S-video connector 60 to S-video connector 52 with an S-video cable as previously described in conjunction with FIG. 3. VCR 74 is also connected to television 50 via RCA cable 80. RCA cable 80 thus connects video output 88 of VCR 74 to video input 82, left channel audio output 90 to left channel input 84 and right channel audio output 92 to right channel audio input 86.

In order to allow a user to change channels and control the various devices by remote control, Internet terminal 20 may incorporate a mechanism that prevents a user from having to use a separate remote control for each consumer electronics device. For example, Internet terminal 20 may be a WebTV Plus set-top box, which provides an IR blaster (an infrared emitter) that can be used to deliver infrared information from Internet terminal 20 to various consumer electronics devices. This allows a user, for example, to change channels using the remote control for Internet terminal 20, which will then relay the command to the appropriate device, such as cable box 64 or VCR 74, by transmitting appropriate infrared signals through IR blaster cable 94. This capability requires a user to connect IR blaster cable 94 and place the other end of the cable in a location where the cable can deliver infrared information to the infrared receivers of cable box 64 and VCR 74, as illustrated in FIG. 6. As illustrated in FIG. 6, IR blaster cable 94 has an emitter assembly 96 which may be positioned on cable box 64 such that the infrared receiver of cable box 64 can receive the signals emitted from emitter assembly 96. In the example shown in FIG. 5, IR blaster cable 94 has two IR emitter assemblies. Although both emit IR simultaneously, the VCR 72 and cable box 64 normally will only respond to IR signaling encoded for each device.

The configuration of FIG. 5 represents just some of the complexity that can occur when a user desires to connect multiple consumer electronics devices to a television. A couple of observations should be made about the configuration illustrated in FIG. 5. As illustrated in FIG. 5, cable box 64 is connected to VCR 74 which is connected to Internet terminal 20 which is connected to television 50. In addition, another connection exists between VCR 74 and television 50. Such a configuration allows, for example, a user to record one channel on VCR 74 while, simultaneously, watching a different channel on television 50. However, it can be seen that should other consumer electronics devices wish to be placed in the chain, cabling modifications will have to be made. Not all configurations will allow a user to record video information from one source on a VCR while watching video information from another source. The various configurations can get extremely complicated and it is easy to see while many users cannot figure out how to make connections that allow full use of all features of the consumer electronics devices.

It would, therefore, be an advancement in the art to dramatically simplify the method of connecting various consumer electronics devices to a television. It would also be an advancement in the art to provide a system for delivering instructions to the consumer in a way that is more easily understood than the instruction manuals traditionally used. It would be a further advancement in the art to provide systems and methods for ensuring that the connection established by the consumer is reliable and fully operable. There is also a need in the art for improved methods of identifying and selecting an optimal configuration of a remote control system for various consumer electronics devices. Systems and methods having the foregoing features would be even more valuable if they could be combined with simplified connectors that could be easily understood by virtually any consumer.

SUMMARY AND OBJECTS OF THE INVENTION

The present invention is directed to systems and methods for delivering interactive instructions for setting up and connecting various consumer electronics devices. The invention may also include systems and methods for testing the connection established by the consumer to ensure that it is reliable and fully operable. The connections described in the interactive instructions may be electrical connections established by cables or connections involving an infrared or another remote control system. The present invention allows consumers to conveniently identify techniques for connecting the consumer electronics devices to realize their full capability.

According to the invention, a consumer connects a first consumer electronics device to a television or another display screen. Upon establishing this connection, the display screen displays interactive information guiding the consumer through the process of connecting other consumer electronics devices to the home entertainment or information system. First, the instructions may include a menu or another mechanism for allowing the consumer to identify the types of other consumer electronics devices to be connected. When one of the other consumer electronics devices is identified, the first consumer electronics device determines a proper way of establishing the connection. This may include determining what cable or cables are needed to connect the devices.

The first consumer electronics device may then determine whether the consumer has the necessary cables. This can be accomplished by querying the consumer or by reviewing a list of standard cables sold with the first consumer electronics device. If the consumer does not have the necessary cables, the cables can optionally be purchased online by the first consumer electronics device.

When the consumer has the necessary cables, the first consumer electronics device displays on the display screen text and/or graphical images describing the proper way to connect the consumer electronics devices. The consumer then establishes the connection as instructed. Once the connection is established, the first consumer electronics device can transmit or receive signals over the connection to determine whether the connection is fully established and whether the other consumer electronics device is fully functional in the consumer electronics system. If it is found that the consumer did not correctly establish the connection, the same or more detailed instructions may be displayed on the display screen to allow the consumer to correct the mistake.

The invention also extends to situations where establishing a connection involves configuring a remote control system to control multiple consumer electronics devices. The remote control system configuration can include, for example, configuring an IR blaster connected to the first consumer electronics device to relay infrared signals having the appropriate format and speed to the other consumer electronics device. When the first consumer electronics device is connected to the display screen, the instructions delivered to the consumer may include options for configuring the remote control system. When the consumer identifies the consumer electronics device to be controlled by the IR blaster, the first consumer electronics device can test various signal formats and speeds to reliably identify the proper signal configuration.

In order to further simplify the task of connecting various consumer electronics devices, one of the consumer electronics devices may be provided with a plurality of identical, interchangeable connectors. These connectors allow consumers to quickly and easily interconnect any number of consumer electronics devices. The connectors are identical in that each connector is of the same type and has the same number of connector pins. The connectors are interchangeable in that any cable may be plugged into any connector and function properly. This eliminates errors that often occur when users connect the wrong cable to the wrong connector. All such cabling mismatches are totally eliminated by the present invention.

In order to connect the consumer electronics device with the plurality of connectors to other consumer electronics devices, a plurality of cables are provided, each specifically adapted to connect to a particular consumer electronics device. For example, if a user has a television with only a VHF/UHF coaxial connector, then the user would select a cable that had on one end a connector designed and clearly labeled to connect to the VHF/UHF connector. The other end of the cable would terminate in a connector designed to attach to any one of the plurality of identical, interchangeable connectors. The user would thus take the cable, plug it into any open connector and connect the other end to the appropriate connector on the television.

In view of the foregoing, the interactive instructions and connection testing features of the invention greatly simplify the task of connecting various consumer electronics devices. Consumers can easily identify an optimal connection configuration of their consumer electronics systems. If the consumer misunderstands the instructions and incorrectly establishes the connection, the mistake is identified when the connection is tested. Accordingly, consumers are guided through the process of connecting the consumer electronics devices to the extent that virtually any consumer can successfully establish the connections.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 16 represents a cable to connect to a satellite receiver;

FIG. 17 represents a cable to connect to a device having an IEEE 1394 connector.

DETAILED DESCRIPTION OF THE PREFERRED EMBODIMENTS

Figure 1:
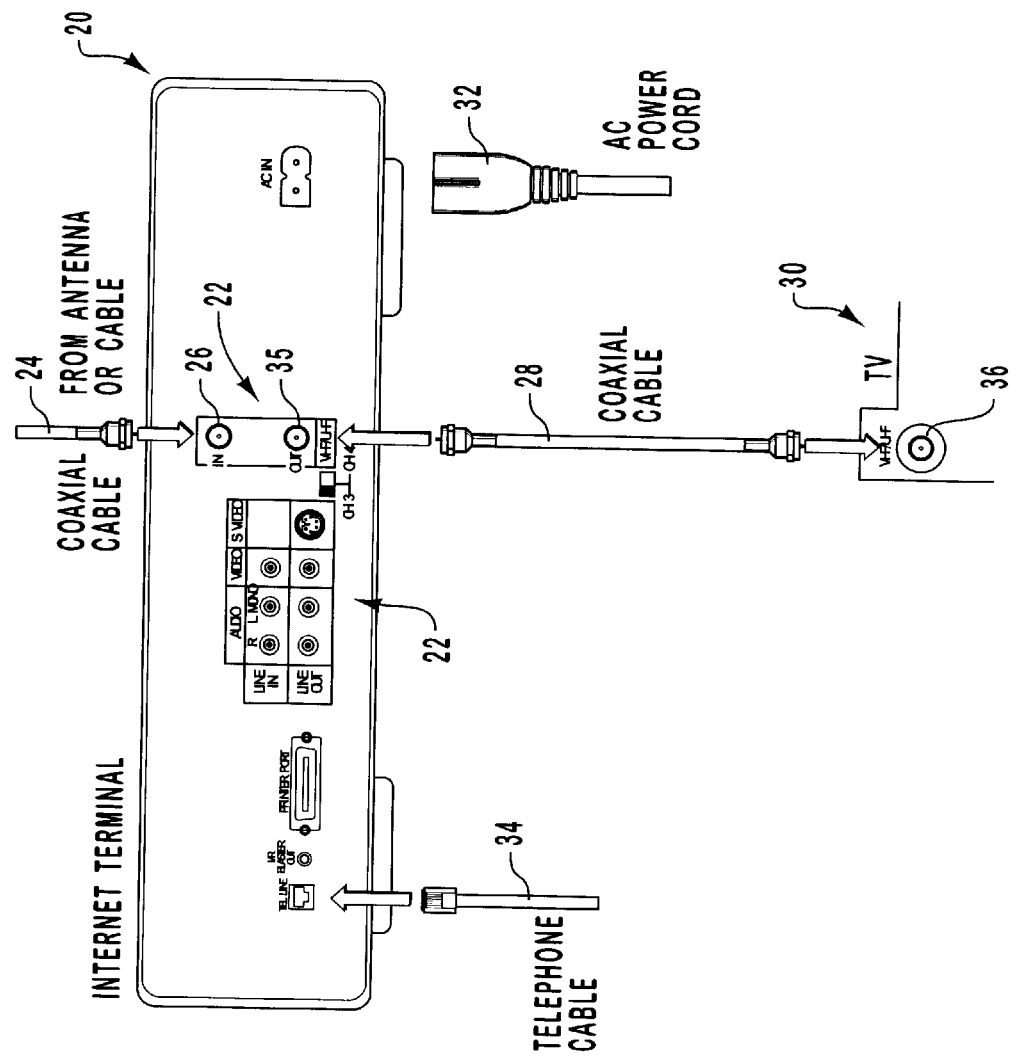
FIG. 1 is a basic configuration connecting an Internet terminal to a television.
Figure 2:
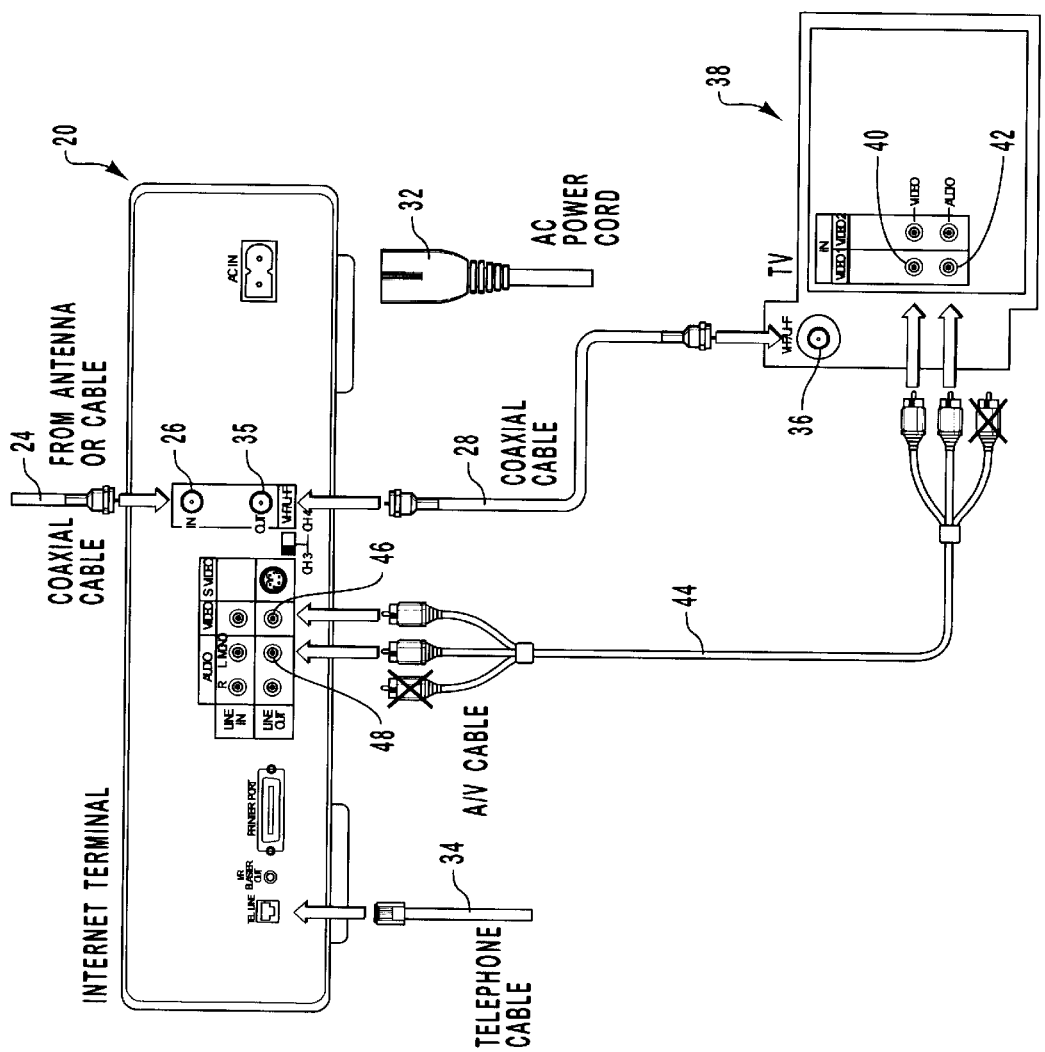
FIG. 2 is another configuration connecting an Internet terminal to a television having line video and audio inputs.
Figure 3:
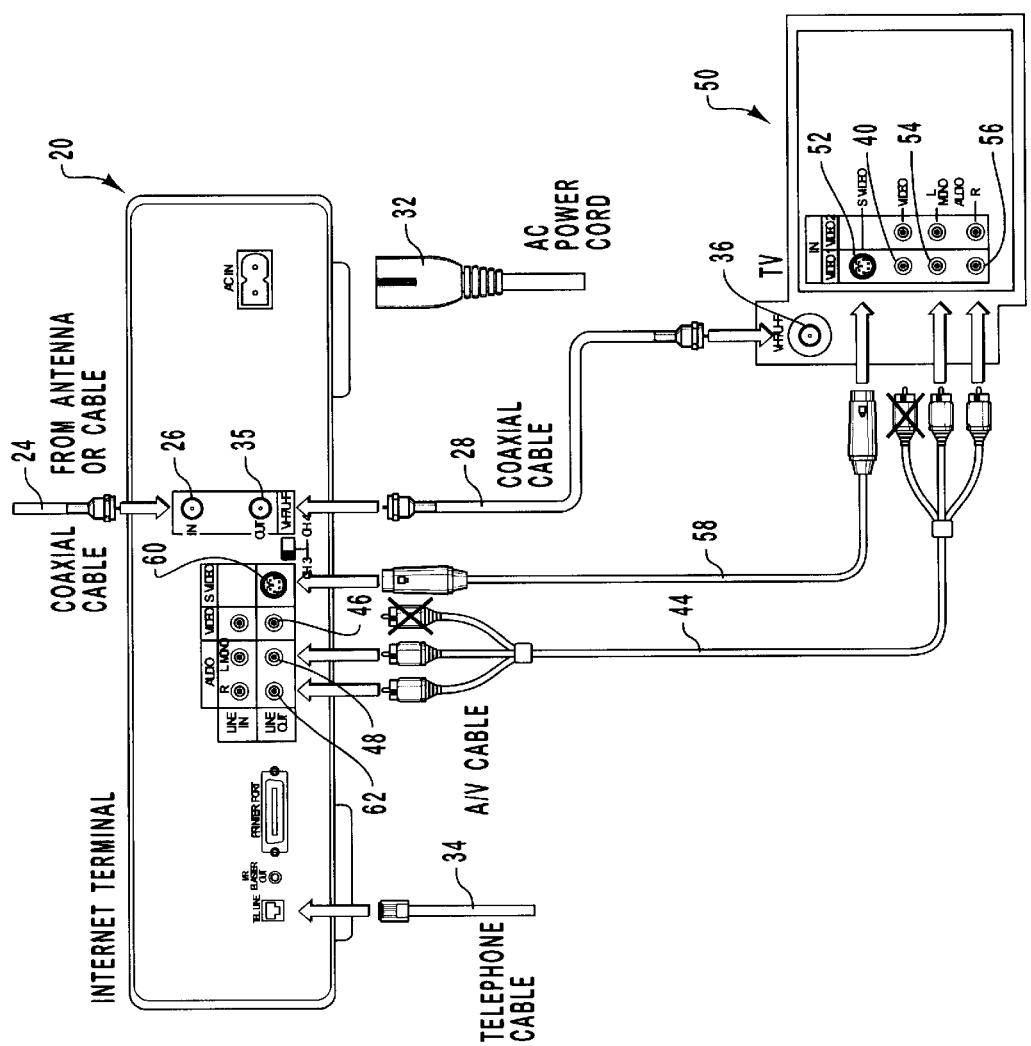
FIG. 3 illustrates connecting an Internet terminal to a television having both S-video inputs as well as line video and audio inputs.
Figure 4:
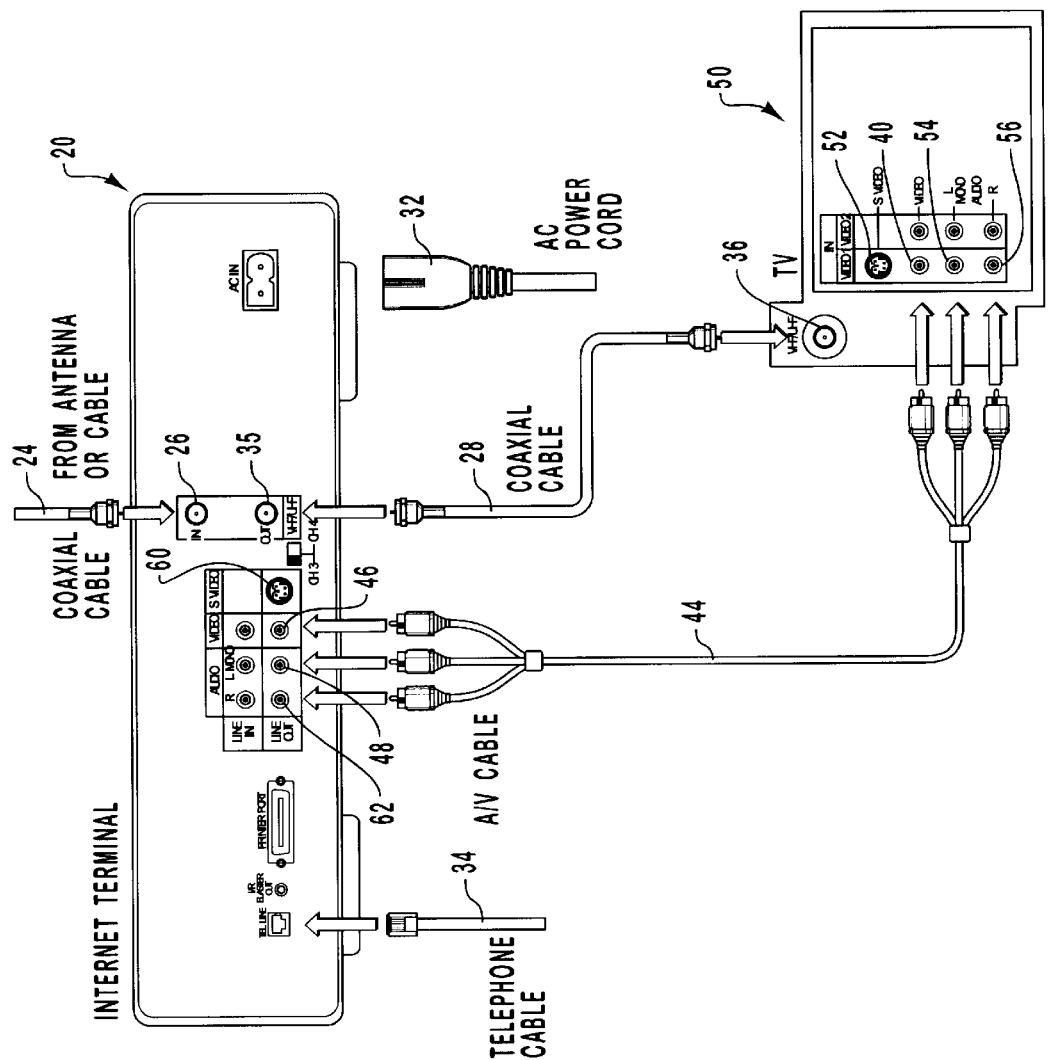
FIG. 4 is another example of connecting an Internet terminal to a television having S-video input as well as line video and audio inputs.

The present invention is directed to systems and methods for delivering interactive instructions for setting up and establishing interactivity between various consumer electronics devices. The interactivity described in the interactive instructions may be electrical connections established by cables or the configuration of an infrared or another remote control system. When the interactive instructions describe electrical connections, the invention may also include testing the connection established by the consumer to ensure that it is reliable and fully operable. The present invention allows consumers to conveniently identify techniques for connecting the consumer electronics devices to realize their full capability.

The invention is described below by using diagrams to illustrate either the structure or processing of embodiments used to implement the system and method of the present invention. Using the diagrams in this manner to present the invention should not be construed as limiting of its scope. The embodiments of the present invention may comprise a consumer electronics device including a special purpose or general purpose computer including various computer hardware, as discussed in greater detail below.

As used herein, the term "consumer electronics device" is used to refer to any number or type of electronics devices that can be connected to television set, a computer monitor, or another display screen. Such devices include but are not limited to, cable boxes, satellite receivers, VCRs, video game machines, video disk players, home theater equipment, and Internet terminals.

Embodiments within the scope of the present invention include computer-readable media having computer-executable instructions or data fields stored thereon. Such computer-readable media can be any available media which can be accessed by a general purpose or special purpose computer. By way of example, and not limitation, such 2 computer readable media can comprise RAM, ROM, EEPROM, CD-ROM or other optical disk storage, magnetic disk storage or other magnetic storage devices, or any other medium which can be used to store the desired computer-executable instructions or data fields and which can accessed by a general purpose or special purpose computer. Combinations of the above should also be included within the scope of computer readable media.

Computer-executable instructions comprise, for example, instructions and data which cause a general purpose computer, special purpose computer, or special purpose processing device to perform a certain function or group of functions. The computer-executable instructions and associated data fields represent an example of program code means for executing the steps of the invention disclosed herein. In some contexts, the computer-executable instructions will be described as program modules being executed by a computer or processor within a consumer electronics device. Generally, program modules include routines, programs, objects, components, data structures, etc. that perform particular tasks or implement particular abstract data.

Figure 7:
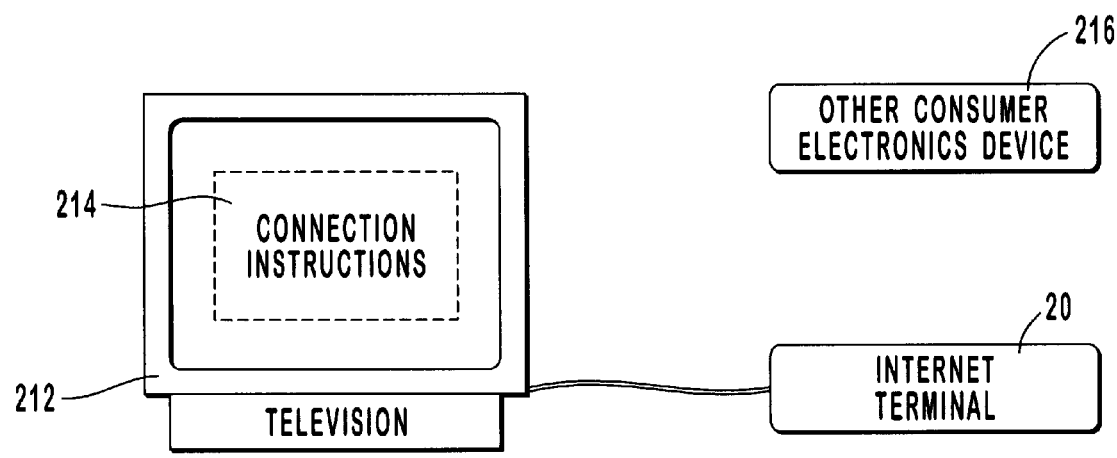
FIG. 7 depicts an Internet terminal connected to a television, with instructions for connecting consumer electronics devices to the Internet terminal being displayed on the television.

As shown in FIG. 7, a first consumer electronics device is connected to a television or another display screen in preparation for connecting other consumer electronics devices. The first consumer electronics device can be any consumer electronics device including those listed above. For purposes of illustration, an Internet terminal 20 is presented as an example of the first consumer electronics device. However, those skilled in the art will recognize that the principles of the invention may be equally applied to any other type of first consumer electronics device. In one embodiment of the invention, Internet terminal 20 can be a WebTV set-top box manufactured by WebTV Networks, Inc. of Palo Alto, Calif.

Internet terminal 20 has been connected to television 212 in FIG. 7. The connection between Internet terminal 20 and television 212 may be established, for example, the first time that the consumer uses Internet terminal 20. Instead of or in addition to a traditional instructions manual, television 212 displays connection instructions 214 that are presented to instruct the consumer how to connect one or more other consumer electronics devices 216 to Internet terminal 20 or television 212.

Electrically Connecting Consumer Electronics Devices

Figure 8:
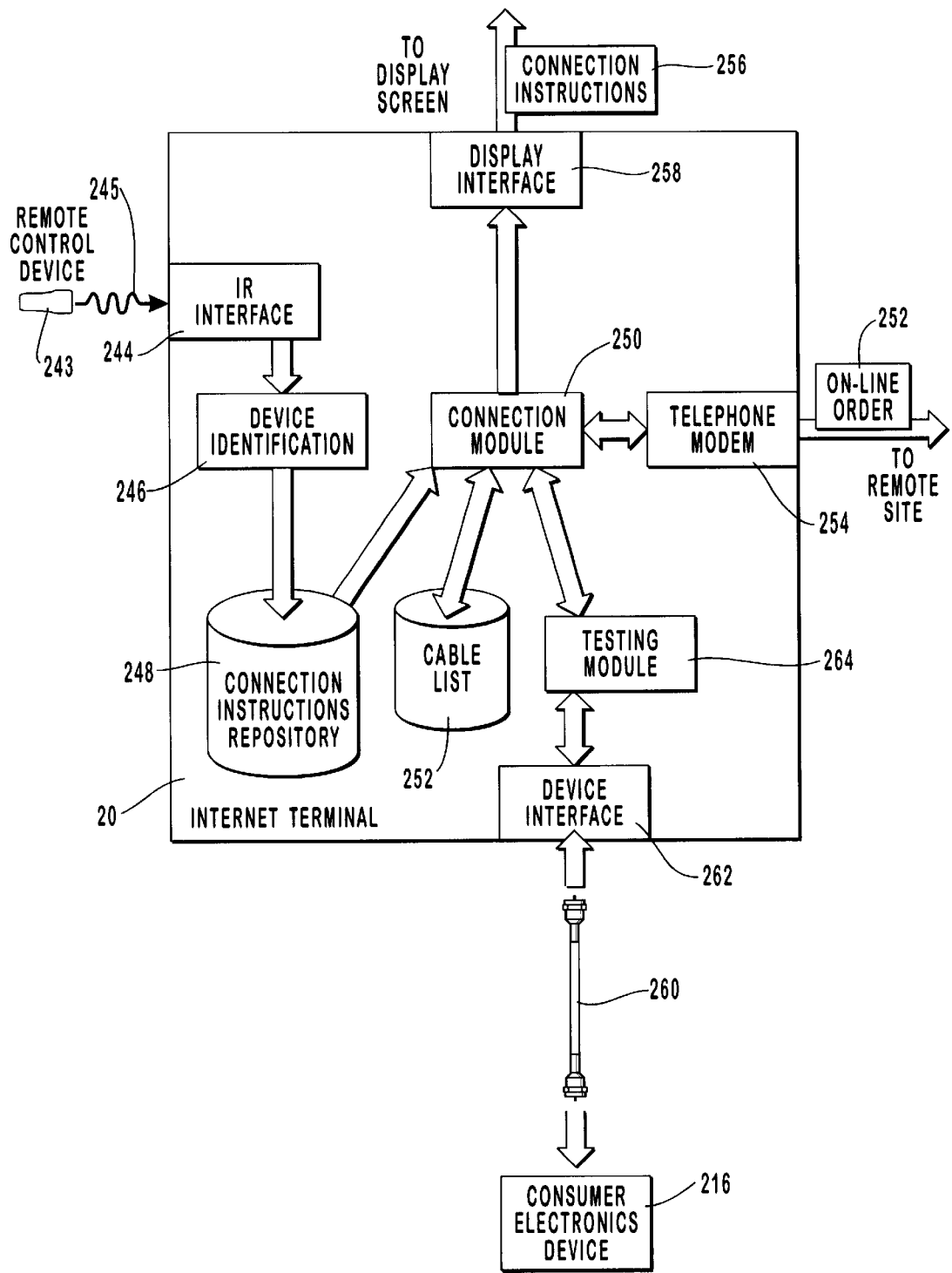
FIG. 8 is a conceptual diagram illustrating features of an Internet terminal for displaying connection instructions and for testing the connections.
Figure 9:
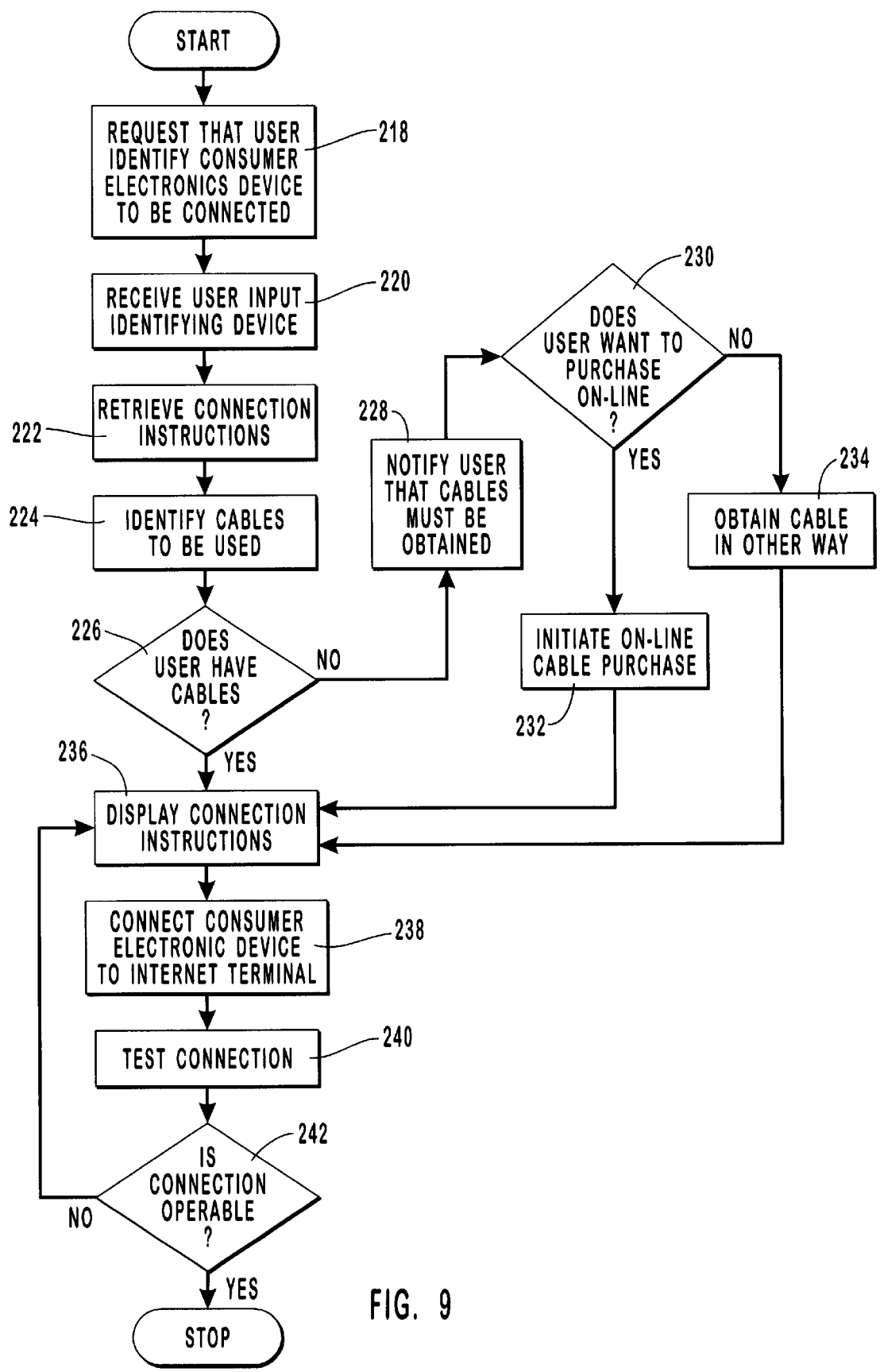
FIG. 9 is a flow diagram illustrating a method of establishing a connection between consumer electronics devices according to the invention.

FIGS. 8 and 9 illustrate one embodiment of the systems and methods for connecting various consumer electronics devices according to the invention. In a first step of the method of this embodiment, Internet terminal 20 of FIG. 8 requests that the user identify the consumer electronics device that is to be connected in step 218 of FIG. 9. In step 220, the Internet terminal receives the user input identifying the consumer electronics device. For example, in FIG. 8, the consumer may use a handheld remote control device 243 to select a menu choice displayed on the television. IR signals 245 emitted from remote control device 243 are received by an infrared interface 244 at Internet terminal 20. Information encoded in IR signals 243 is then passed to a device identification module 246, which identifies the consumer electronics device that the user desires to connect to the consumer electronics system. A connection instructions repository 248, which may be a database stored in a computer-readable medium at Internet terminal 20, contains instructions for connecting any of a large number of consumer electronics devices to the Internet terminal or the associated television.

Referring now to FIG. 9, the connection instructions associated the identified consumer electronics device are retrieved in step 222. The connection instructions are information instructing a user how to establish interactivity between consumer electronics devices. As seen in FIG. 8, the connection instructions may be passed, for example, to a connection module 250, which coordinates display of the instructions as further described herein. According to step 224 of FIG. 9, the retrieved connection instructions specify a cable or cables that are preferred or necessary to connect the consumer electronics device to the other components of the system. In decision block 226, it is determined whether the user has a cable or cables identified in step 224.

In one implementation of the invention, Internet terminal 20 is sold with one or more standard cables that may be used to connect the Internet terminal to common consumer electronics devices. These standard cables are identified in a cable list 252 stored in a computer-readable medium at Internet terminal 20. In this example, connection module 250 checks the entries in cable list 252 to determine whether the cable or cables needed to connect the consumer electronics device have been sold with Internet terminal 20. In an alternative method of determining whether the user has the necessary cables, connection module 250 may identify on the television the cables that the consumer needs. The consumer may then respond by means of the remote control device to indicate whether the consumer has the cables.

If the user does not have the cables, the method of FIG. 9 proceeds from decision block 226 to step 228, wherein Internet terminal 20 notifies the consumer that the consumer must obtain the cables in order to establish the appropriate connection. According to decision block 230, Internet terminal 20 determines whether the user wants to purchase the cables online. Depending on user response, the method may proceed either to step 232 wherein Internet terminal 20 initiates an online cable purchase or step 234 wherein the consumer is left to obtain the cables in another way. Referring now to FIG. 8, if the Internet terminal 20 is to make an online purchase, connection module 250 may initiate a transmission of an online order 252 to a remote site via a telephone modem 252 or another communications device included in the Internet terminal.

As depicted in FIG. 9, the consumer possesses the necessary cables at this point in the method. Regardless of whether the consumer already had the cables, an online order was made, or the consumer obtained the cables in another way, the method proceeds to step 236, in which Internet terminal 20 displays the connection instructions. For example, referring to FIG. 8, connection module 250 transmits connection instructions 256 to the display screen of the television via a display interface 258 included in Internet terminal 20. The connection instructions may include text and/or graphical images describing the proper way to connect the consumer electronics devices. For example, the graphical images can depict the Internet terminal, at least one other consumer electronics device, and means for connecting the Internet terminal to the other consumer electronics device. Any suitable cable represents an example of the means for connecting the Internet terminal (or any desired consumer electronics device) to the other consumer electronics device.

Returning to FIG. 9, the consumer views the displayed connection instructions and, in step 238, connects the consumer electronics device to the Internet terminal or to the associated television. As illustrated in FIG. 8, establishing the connection may involve connecting a cable 260 between consumer electronics device 216 and a device interface 262 at Internet terminal 20. As further disclosed herein in reference to FIGS. 11–18, device interface 262 may be any of a number of identical, interchangeable connectors that are included in Internet terminal 20 according to one embodiment of the invention. Moreover, cable 260 may be the appropriate connector adapted to be coupled with the identical, interchangeable connectors of the Internet terminals according to the embodiments illustrated in FIGS. 11–18. Alternatively, device interface 262 may be any conventional connector included in Internet terminals or other consumer electronics devices, while cable 260 may be any suitable, conventional cable for interconnecting consumer electronics devices.

According to this embodiment, once the consumer has attempted to establish the connection described in the connection instructions, Internet terminal 20 tests the connection to ensure that it is reliable and fully operable as illustrated by step 240 of FIG. 9. For example, in FIG. 8, testing module 264 at Internet terminal 20 monitors signals transmitted over cable 260 between the Internet terminal and consumer electronics device 216. Testing the connection may include detecting the presence of appropriate signals being transmitted over cable 260 or by testing the response of consumer electronics device 216 to selected input signals.

If the results of the testing procedure indicate that the connection is reliable and fully operable, the process of connection the consumer electronics device is complete as illustrated by decision block 242 of FIG. 9. If however, the results of step 240 indicate that the connection is not fully established, the method proceeds from decision block 242 back to step 236. Because the reason for the incorrectly established connection is often that the consumer has misunderstood the instructions, step 236, when repeated, may involve displaying more detailed instructions that specifically point out trouble-shooting ideas and provide feedback information to the consumer. Steps 236, 238, 240, and 242 of FIG. 9 are repeated until the connection is determined to be reliable and fully operable.

While testing the connection established by the consumer has the advantage of detecting any errors that result, for example, from misunderstanding the instructions, the invention instead may be practiced without the step of testing the connection. In particular, the invention may be practiced without steps 240 and 242 of FIG. 9. According to this option, the consumer establishes the connection as described in the instructions and can then manually test the operability of the consumer electronics device.

Configuring Remote Control System

One part of connecting multiple consumer electronics devices often includes configuring a remote control system so that a single remote control device can operate more than one consumer electronics device. When Internet terminal 20 is a WebTV set-top box, the remote control system for controlling multiple consumer electronics devices may include the IR blaster emitter assembly 96 of FIG. 6. If more than one additional consumer electronics device is connected to Internet terminal 20, each consumer electronics device may be equipped with an emitter assembly 96. Alternatively, a single IR blaster with an infrared emitter may be positioned in a room such that each of the multiple consumer electronics devices is capable of receiving the infrared signals.

Figure 6:
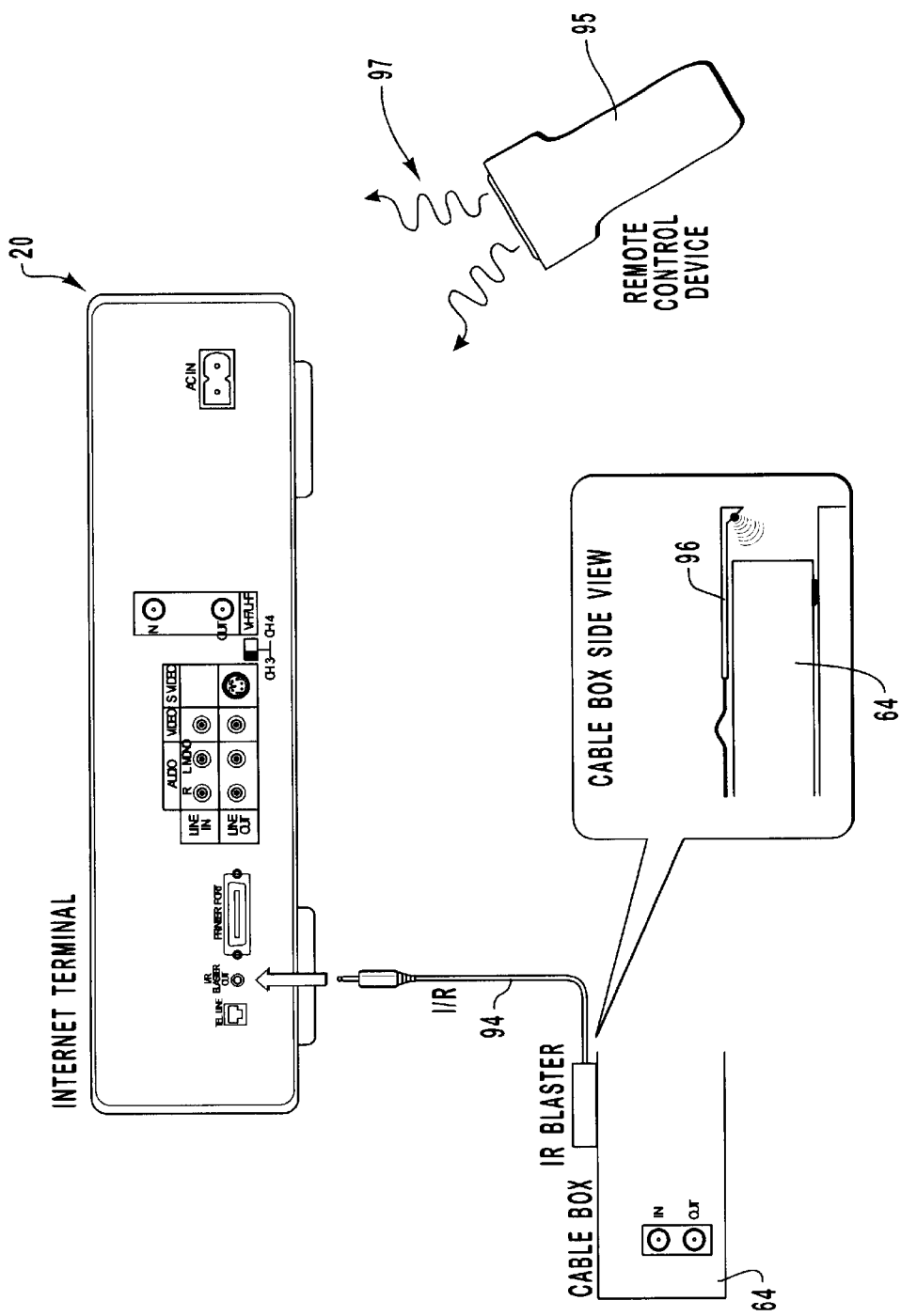
FIG. 6 illustrates connecting the IR cable from an Internet terminal to another consumer electronics device.
Figure 10:
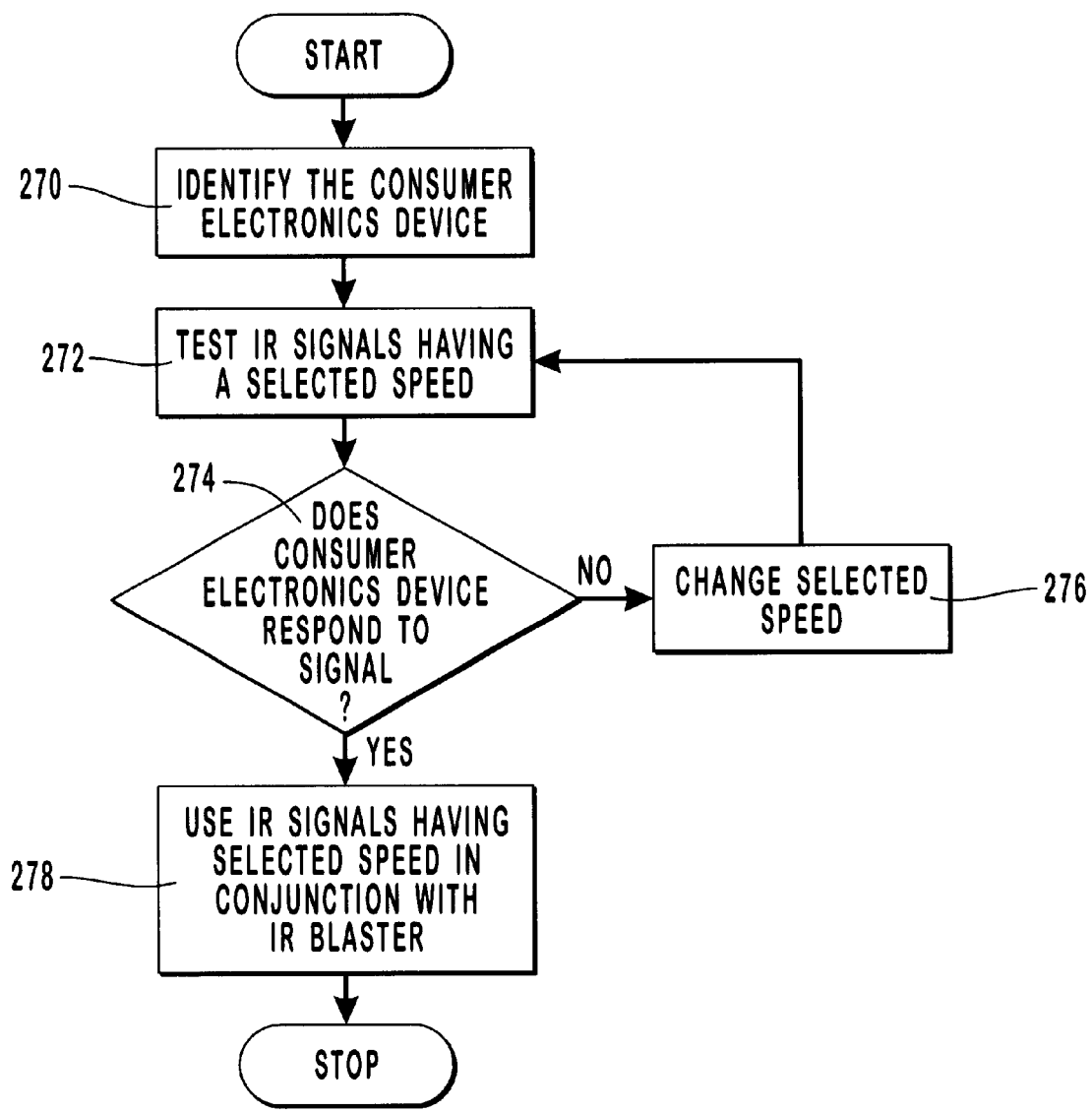
FIG. 10 is a flow diagram illustrating a method of configuring a remote control system according to the invention.

FIG. 10 is a flow diagram illustrating one embodiment of a method according to the invention for configuring the remote control system to control the consumer electronics device connected with the Internet terminal. As used herein, the term "remote control system" includes a remote control device and any additional equipment that is used to relay signals from the remote control device to their intended destination at a consumer electronics device. In the example of FIG. 6, the remote control system includes remote control device 95, Internet terminal 20, IR blaster cable 94, and emitter assembly 96. In particular, infrared signals 97 emitted from remote control device 95 are received by Internet terminal 20, which transforms infrared signals 97 into signals that are sent through IR blaster cable 94 to IR emitter assembly 96.

Referring to FIG. 10, the user identifies in step 270 the consumer electronics device for which the remote control system is to be configured. This may involve an interactive request by the Internet terminal and input of identifying data from the consumer as described in reference to FIGS. 8 and 9. The data entered by the user is enough to permit the Internet terminal to configure the remote control system to control the identified consumer electronics device, and may be an alphanumeric code associated with the manufacturer of the consumer electronics device. However, as described below, data that only partially identifies the consumer electronics device is enough to permit configuration of the remote control device according to one embodiment of the invention. For example, if the user identifies the manufacturer of a VCR, but does not identify the model number, a trial and error approach can be used to correctly configure the remote control system.

Many manufacturers periodically upgrade the features of their consumer electronics devices. For example, over a period of years, a VCR manufacturer may improve various features of its VCRs. As a result, many brands of VCRs and other consumer electronics devices respond to infrared remote control signals at different speeds, with more recent models generally responding to faster speeds. Thus, without a great deal of information from the consumer, the Internet terminal may not be able to immediately determine the infrared signal speed associated with a particular consumer electronics device. For example, if the user identifies a VCR only by the manufacturer, the appropriate IR signal speed may initially be indeterminate.

The method of FIG. 10 includes step 272, wherein infrared signals having a selected speed are transmitted to the consumer electronics device. The selected speed may be chosen as the highest speed known to be compatible with the most advanced models of the manufacturer or the type of consumer electronics device. According to decision block 274, if the consumer electronics device does not respond o the infrared signals at the selected speed, the method proceeds to stop 276 in which the selected speed is changed, typically downward. Steps 272, 274, and 276 are repeated until the consumer electronics device responds to the signals at the current selected speed, at which point the method proceeds from decision block 274 to step 278. Alternatively, additional speeds and signal formats may be further tested even when a particular signal has been found to be operable in order to identify an optimal signal configuration. For example, several speeds and signals formats may be tested to identify the speed and format the produce the best response in the consumer electronics device. In step 278, remote control system is configured to relay infrared signals having the selected speed and configuration from the Internet terminal to the consumer electronics device via the IR blaster.

Identical, Interchangeable Connectors and Associated Cables

Figure 11:
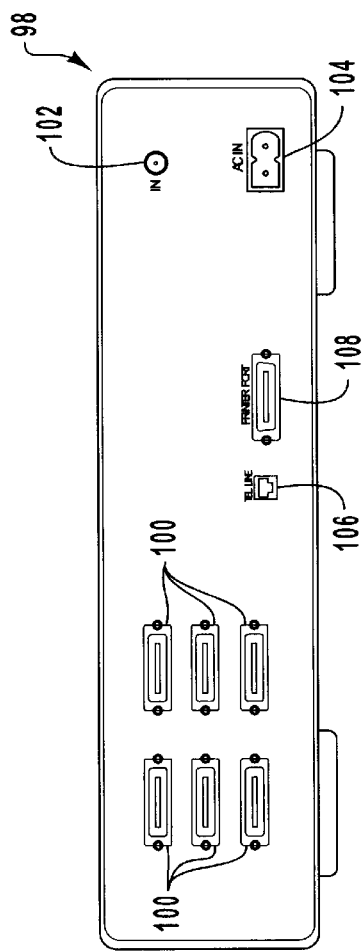
FIG. 11 represents an Internet terminal or other consumer electronics device with connectors according to the present invention.

The methods and systems of the invention for providing interactive instructions and otherwise simplifying and verifying the process of establishing connections between consumer electronics devices optionally include the use of identical, interchangeable connectors at one of the consumer electronic devices. In FIG. 11, a consumer electronics device, such as an Internet terminal, is illustrated generally as 98. In order that a plurality of consumer electronics devices may be interconnected, embodiments of the present invention may comprise a plurality of identical, interchangeable, connector means for connecting to a plurality of different cable types. These connector means will typically comprise a plurality of conductors or pins adapted to carry electrical signals.

By way of example, and not limitation, in FIG. 11, the plurality of connector means are illustrated by tongue and groove connectors 100. A wide variety of various connectors may be employed for the connector means. Tongue and groove connectors are simply one example. The tongue and groove connectors, however, have certain characteristics that makes them particularly well suited for the present invention. For example, tongue and groove connectors are extremely inexpensive and are widely available. Such tongue and groove connectors are found on a plurality of different devices from PC card modems to video game machines. The tongue and groove connectors also have a plurality of pins that can be used to carry various types of electrical signals. As described in greater detail below, many cables which are connected to consumer electronics device 98 have a plurality of conductors designed to carry various types of signals. Providing connectors with a plurality of pins allows all signals to be carried through a single connector. Finally, the tongue and groove connectors come in a variety of sizes that are well suited to various embodiments of the present invention.

In the present invention, connectors 100 are identical in that a cable which connects to one connector will physically connect to any other connector as well. Thus, a single cable may be connected to any one of the identical connectors. The connectors of the present invention are also interchangeable in that any cable may be connected to any connector and function properly. This functionality may be provided in a number of various ways. The details of how this functionality may be provided are presented below. In summary, however, in one embodiment as a cable is plugged into a connector, the pins are reconfigured in order to be compatible with the cable and carry the appropriate signals.

Figure 5:
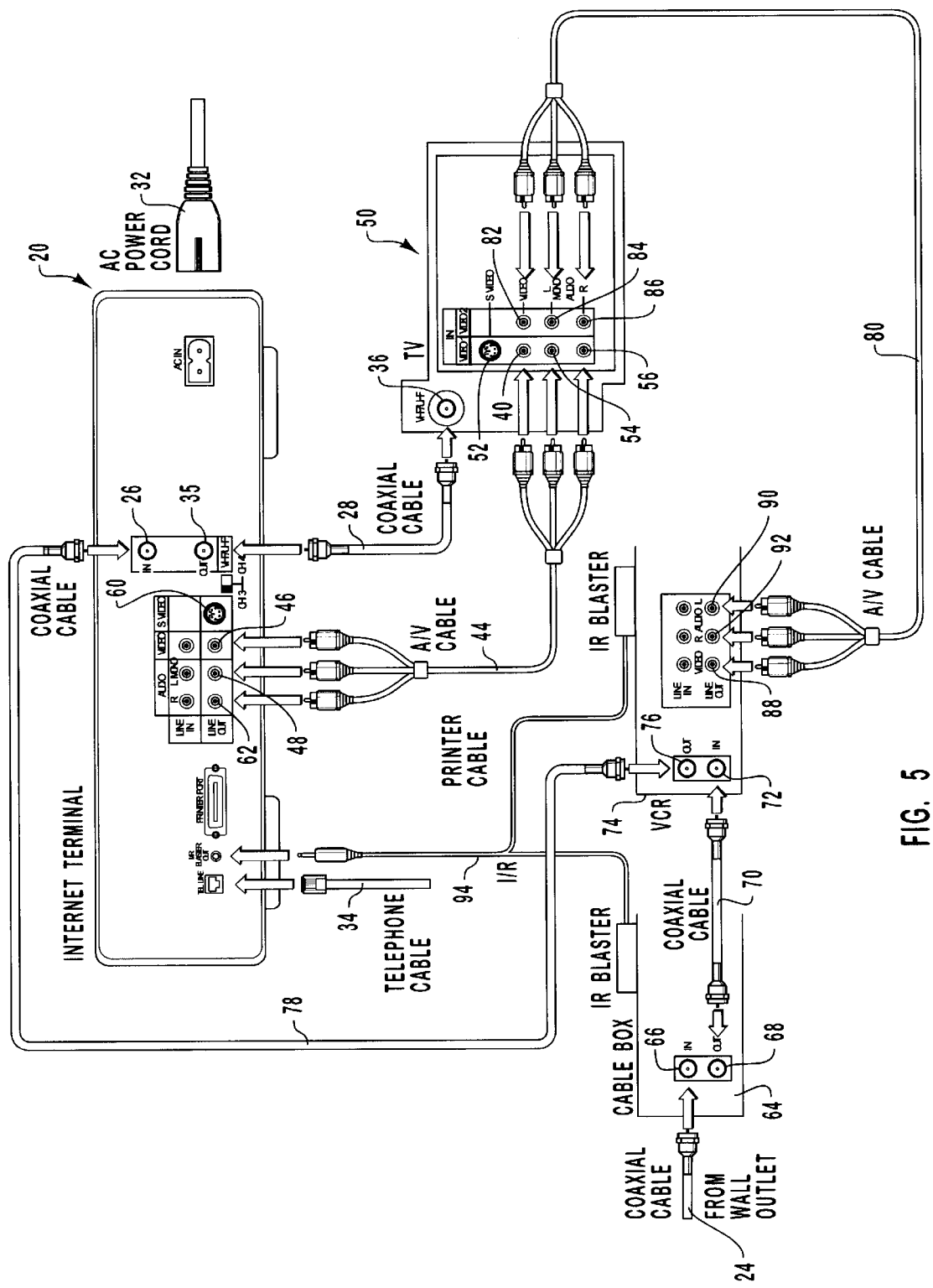
FIG. 5 illustrates connecting an Internet terminal, a cable box, and a VCR to a television.

By providing a plurality of identical interchangeable connectors on the back of the consumer electronics device, certain types of cabling errors are eliminated. For example, in the configurations illustrated in FIGS. 1–5, cabling errors often occur when a user interconnects the wrong connectors. For example, referring to FIG. 5, it can be extremely easy to interchange the RCA jacks of cable 44 so that they are misconnected and do not connect to the proper connectors of Internet terminal 20. In order to reduce such cabling errors, RCA cables, such as cable 44, often attempt to color code the connectors at either end so that a user can identify which cable connector attaches to which connector on the back of the Internet terminal. However, it is still possible to interchange them. In addition, many errors occur when a user connects to the input connectors rather than the output connectors. By providing a single connector on the back of the consumer electronics device with a plurality of pins that can carry appropriate electrical signals, any such cabling errors are eliminated. Furthermore, by providing a plurality of identical, interchangeable connectors, users do not have to identify which connector goes to which consumer electronics device. The advantage of this feature will become more apparent in the discussions below.

In addition to connectors 100, consumer electronics device 98 also has input connector 102 which is a standard RF coaxial connector that is connected to an antenna or the cable which comes directly from the cable television provider. Connection to cable boxes and/or satellite receivers will be covered below. Consumer electronics device 98 also has power connector 104 to connect to a power cable. If consumer electronics device 98 is an Internet terminal, then consumer electronics device 98 may also be provided with telephone connector 106 to connect to a telephone line and printer port 108 to connect to a printer.

Although the embodiment illustrated in FIG. 11 has six tongue and groove connectors, as will be illustrated below, the number of tongue and groove connectors need only be sufficient to connect to the number of consumer electronics devices that a user desires. For example, if a user desires to only connect to a cable box and VCR, then only three tongue and groove connectors may need to be provided (one connector is required to connect to the television set). If a consumer has a wide variety of consumer electronics devices, such as a satellite receiver, a cable box, a video game machine, a video disk player, a VCR, and so forth, then more connectors are required.

FIGS. 12A–17 illustrate various types of cables which can connect various types of consumer electronics devices to a device configured according to the present invention. From this point on, consumer electronics device 98 will be presumed to be an Internet terminal simply to simplify the notation and discussion below. However, as previously discussed, those skilled in the art will recognize these principles can be applied to any type of consumer electronics device.

Figure 12B:
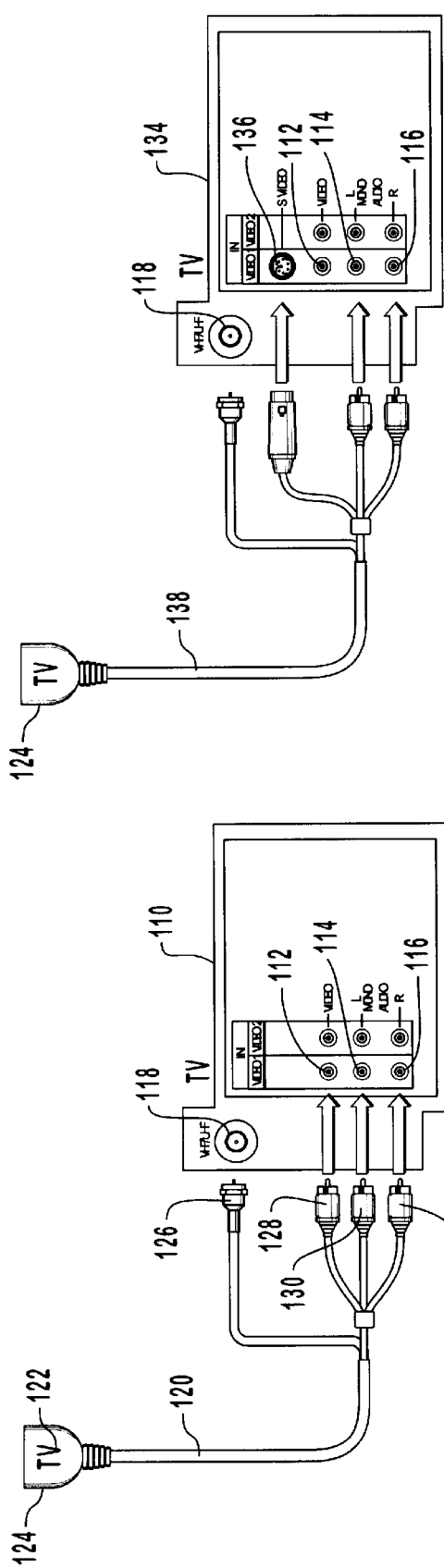
FIGS. 12A and 12B illustrate various cables adapted to connect to various types of televisions.
Figure 12A:
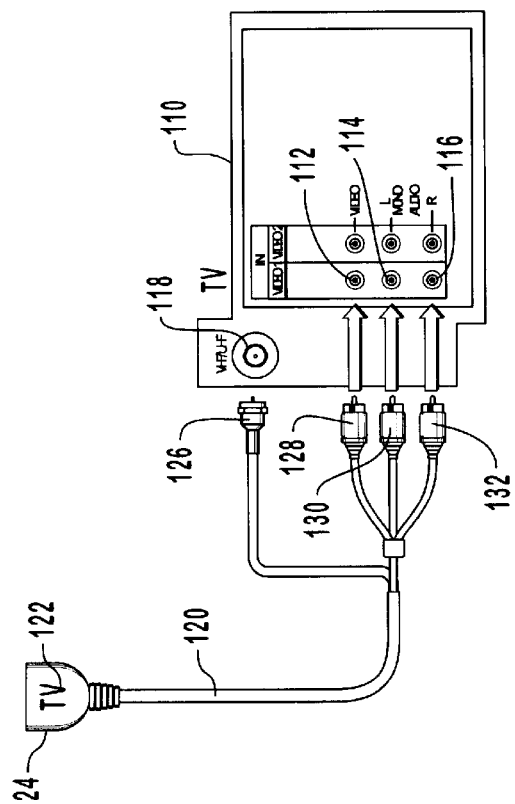
Figure 12D:
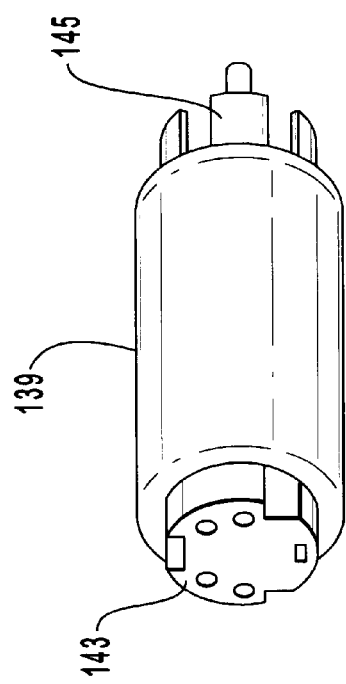
FIGS. 12C and 12D illustrate a cable and an associated adapter that allows the cable to be used with S-video and RCA television formats.

Referring first to FIG. 12A, a cable is shown that connects to a television having video and audio line inputs. In FIG. 12A, television 110 has video input 112, left channel audio input 114, and right channel audio input 116. Television 110 also has VHF/UHF connector 118. Cable 120 is specifically adapted to connect to television 110. Thus, cable 120 is provided with a conspicuous label 122 indicating that the cable is for attaching a television to the Internet terminal. In FIG. 12A, label 122 is provided on connector 124. Connector 124 is adapted to attach to any of the identical, interchangeable connectors on the Internet terminal, such as connectors 100 of FIG. 11. The other end of cable 120 is provided with a plurality of connectors, each adapted to attach to the appropriate television connector. For example, connector 126 is adapted to connect to connector 118, connector 128 is adapted to connect to connector 112, connector 130 is adapted to connect to connector 114, and connector 132 to connector 116.

Because the cable is specifically adapted to attach to a particular type of television set having a defined set of connectors, each connector on the cable can be conspicuously labeled. For example, connector 126 may be conspicuously labeled with the legend "to VHF/UHF" or a similar legend which clearly indicates that connector 126 is to be attached to connector 118. The remaining connectors may also be similarly labeled. Note that such labeling prevents yet another type of cabling error that sometimes occurs. Referring back to FIG. 5, in order to appropriately attach Internet terminal 20 to television 50 via RCA cable 44, a user must specifically identify that the output connectors of Internet terminal 20 are connected to the input connectors of television 50. In other words, the connectors on the Internet terminal are labeled differently than the connectors on the television. This provides yet another source of confusion for many consumers who do not fully understand the concept of signals flowing out of one device and into another. The cable in FIG. 12A prevents such cabling errors first by having the connector that attaches to the Internet terminal be a universal connector that requires no thought to be connected and may be plugged into any one of the identical, interchangeable connectors provided on the Internet terminal. The other end of the cable is clearly labeled so that a user can readily identify which connector on the television they connect to.

As previously illustrated in conjunction with FIGS. 1–5, not all televisions have the identical connectors on the back. FIG. 12B shows another possible television connector arrangement. In FIG. 12B, television 134 is provided with video input 112, left channel audio input 114, right channel audio input 116, and VHF/UHF connector 118. In addition, television 134 is provided with S-video input 136. Cable 138 is thus provided with connectors to connect to S-video input 136, left channel audio 114, right channel audio 116, and VHF/UHF connector 118. The other end of cable 138 is provided with connector 124 adapted to connect to any of the identical, interchangeable connectors of the Internet terminal. In the cable illustrated in FIG. 12B, there is no need to connect both to S-video input 136 and video input 112. Thus, cable 138 is only provided with a connector to connect to S-video input 136. As with cable 120 of FIG. 12A, all connectors that connect to television 134 may be appropriately labeled in order to reduce cabling errors.

Figure 12C:
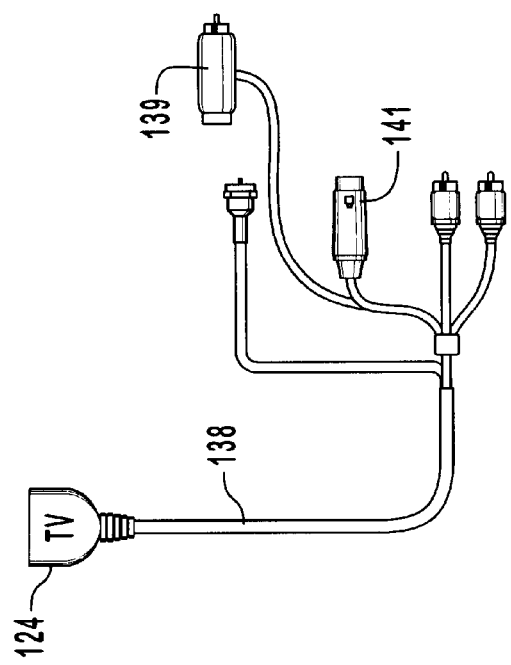

FIG. 12C shows an embodiment of a cable that is compatible with both S-video and RCA video formats. Cable 138 of FIG. 12B is supplemented with an S-video-to-RCA video adapter 139, illustrated in FIGS. 12C and 12D, that allows cable 138 to be used with televisions having either format, thereby reducing the number of cable types that must be supplied or made available. Adapter 139 can be conveniently tethered to cable 138 so that the adapter is not lost when it is not being used. When the television to be connected does not have an S-video connector, or when the user desires to use the RCA video input, adapter 139 is coupled to the end of connector 141. Adapter 139 has a female S-video socket 143 that mates with the male S-video pins of connector 141. At its other end, adapter 139 has a male RCA video coupler 145. When cable 138 is instead to be used with an S-video format television, adapter 139 remains unconnected to connector 141. In this case, connector 141 is coupled with the corresponding S-video connector of the television.

In order for the Internet terminal to properly configure the pins of the interchangeable connector, the Internet terminal, in one embodiment, includes means for sensing which of a plurality of different cable types have been connected. For instance, the means for sensing may determine whether cable 138 is being used with the S-video or RCA format. One possible method of determining whether cable 138 is being used with the S-video or RCA format involves sensing the value of a resistor included in adapter 139. Specifically, adapter 139 can be associated with a specified resistor value between one of its conductors and ground. Accordingly, the means for sensing detects a different resistor value when the adapter is being used than when it is not being used. In response to the detected resistor value, the Internet terminal appropriately configures the pins of the interchangeable connector so that the correct signals are sent over cable 138.

Figure 12E:
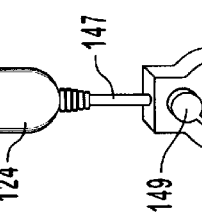
FIG. 12E shows another cable adapted to one type of television.

FIG. 12E illustrates television 140 which has only a VHF/UHF connector 118. Such a television represents, for example, older legacy sets that are still functional but lack many of the modern hardware and circuitry provided in today's televisions. In such a situation, a special cable 142 is specifically adapted to connect only to the VHF/UHF connector. As with the other cables, one end is provided with connector 124 adapted to connect to any of the identical, interchangeable connectors on the Internet terminal. In this situation, however, connector 124 also has switch 144 which allows a user to select an unused channel for the information provided by the Internet terminal. The circuitry for placing the information on the appropriate channel may be incorporated into connector 124, may be incorporated into the Internet terminal itself. In the latter case, the Internet terminal may sense the position of switch 144 and configure itself to provide information on the appropriate channel. Such configuration may involve remembering which channel the Internet information should be supplied on or may require reconfiguration of the connector pins associated with one of the identical, interchangeable connectors.

Other televisions may exist which have slightly different connector arrangements from those shown in FIGS. 12A–12E. However, given the teachings of FIGS. 12A–12E, appropriately configured cables can be supplied. For example, if a television does not have stereo audio inputs, but only a mono audio input, then a cable may be provided that has only one audio connector instead of two.

Figure 13B:
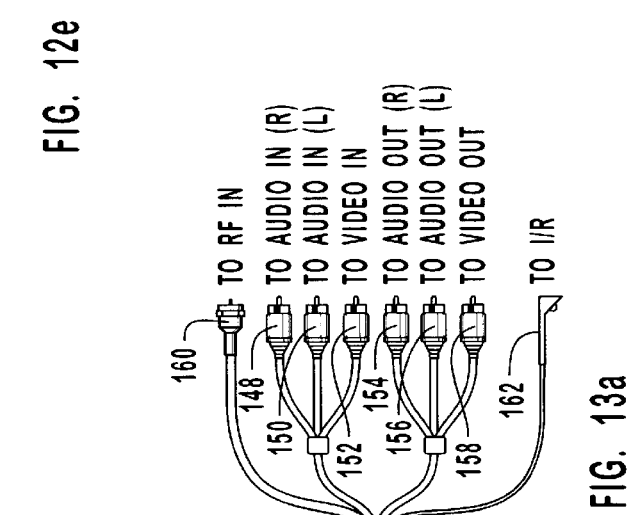
FIG. 13B illustrates a cable having a dial and a switching mechanism that allow the cable to be used with any of multiple consumer electronics devices.
Figure 13A:
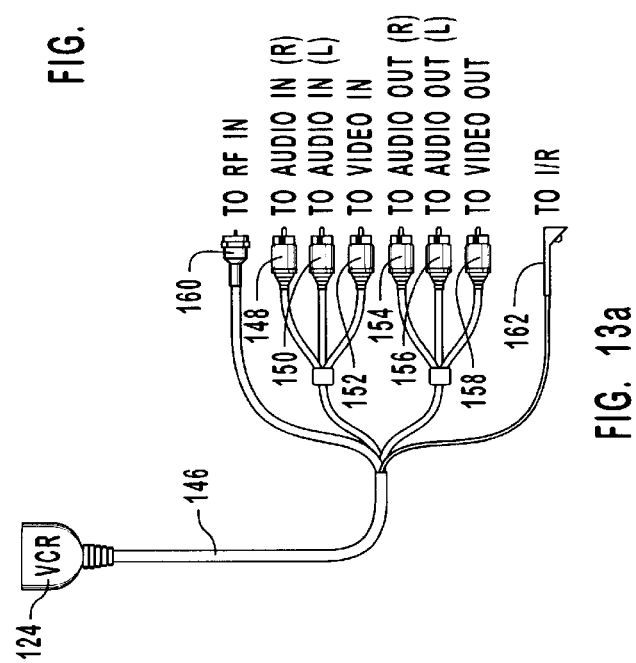
FIG. 13A illustrates a cable to connect to a VCR.

FIG. 13A illustrates a cable specifically adapted to attach to one type of VCR. The cable as shown in FIG. 13A illustrates the various connectors that may be required with a VCR. An examination of the back of a typical VCR reveals that the VCR has not only audio and video line inputs, but also audio and video line outputs. Thus, cable 146 is provided with connectors 148, 150, and 152 to connect to the appropriate line inputs, and connectors 154, 156, and 158 to connect to the appropriate line outputs. In addition, it may be desirable to supply VHF/UHF connector 160 to connect to the VHF/UHF input connector of the VCR. In this situation there is no need to connect to the VHF/UHF output connector of the VCR since such connectors are typically provided so that a daisy chain of consumer electronics devices can be made. The present invention replaces the daisy chain arrangement with a hub and spoke type arrangement with the RF input coming into the center hub. There is, therefore, no need to connect to the RF outputs of any consumer electronics device. As explained below, the RF input comes into the center of the hub and then commonly connects to all appropriate RF inputs of the consumer electronics devices.

Returning now to FIG. 13A, cable 146 is also provided with IR connector 162. IR connector 162 may be in the form of an IR emitter device such as IR emitter assembly 96 of FIG. 6. It is anticipated that the Internet terminal will incorporate an IR receiver to receive commands from a remote control. Rather than requiring the user to use a separate remote to operate the VCR, the Internet terminal can relay the commands to the VCR using IR connector 162. By providing IR connectors to each consumer electronics device with an IR receiver, each consumer electronics device may be controlled by a single remote. The other end of cable 146 is provided with an appropriately labeled connector 124.

FIG. 13B illustrates an embodiment of a cable that includes an optional feature that simplifies the hardware needed to connect a variety of consumer electronics devices to an Internet terminal or to another consumer electronics device. In particular, with the selection of the position of a dial 149 or some other switching mechanism, cable 147 may be configured to connect one of two or more types of consumer electronics devices to an Internet terminal.

In the example illustrated in FIG. 13B, cable 147 has at one end a connector 124 adapted to connect to any of the identical, interchangeable connectors of the Internet terminal. At the other end, cable 147 includes connectors 148, 150, and 152 to connect to the appropriate line inputs of the consumer electronics device with which the cable is used and connectors 154, 156, and 158 to connect to the appropriate line outputs, if any, of the consumer electronics device. In addition, cable 147 includes RF connector 160 to supply VHF/UHF signals to the consumer electronics device. Cable 147 also includes IR connector 162, which may be in the form of an IR emitter device such as IR emitter assembly 96 of FIG. 6. It is noted that the foregoing connectors 148, 150, 152, 154, 156, 158, 160, and 162 may be the same as the corresponding connectors described in reference to FIG. 13A.

Cable 147 further includes means for selecting the conductor configuration of the cable such that the cable may connect the Internet terminal with any one of two or more other consumer electronics devices. One example of such means is dial 149, which may be manipulated by the user in order to indicate what consumer electronics device is to be connected to the Internet terminal. Alternatively, the means for selecting the conductor configuration may be any switch for establishing connectivity over selected conductors in the cable.

It is noted that cable 147 includes the types of connectors that correspond to the input connectors of a television, a VCR, and a cable box, among other possible consumer electronics devices. Specifically, connectors 152, 150, 148, and 160 of cable 147 can be coupled with input connectors 112, 114, 116, and 118 of television 110 of FIG. 12A. Connectors 154, 156, 158, and 160 can be coupled to the corresponding connectors of a cable box. As described above in reference to FIG. 13A, connectors 148, 150, 152, 154, 156, 158, 160, and 162 can be coupled with the corresponding connectors of a VCR.

Dial 149 controls a switching mechanism within cable 147 that selects conductors in the cable to transmit signals between connector 124 and the particular connectors at the other end of the cable that are to be coupled to the consumer electronics device. For example, dial 149 may have three positions, one for each of the television, cable box, and VCR with which cable 147 may be used. Dial 149 can be conspicuously labeled to indicate 8 the available dial settings and to inform the user that the cable is compatible with various consumer electronics devices. When cable 147 is to be used, for instance, with a television, the dial is set to the television position. The switching mechanism within cable 147 establishes connectivity across the appropriate conductors, thereby configuring the cable to be used with the television. In this example, the switching mechanism can also establish connectivity across the appropriate conductors for cable boxes and VCRs when the dial is turned to the corresponding settings. Of course, in other embodiments, cables equipped with the dial or another example of the means for selecting the cable configuration can be compatible with multiple consumer electronics devices other than or in addition to the television, cable box, and VCR specifically described in reference to FIG. 13B.

This optional feature of the invention provides the advantage of reducing the number of cable types that must be obtained to connect a variety of consumer electronics devices to the Internet terminal. For many users, this can further simplify the task of connecting multiple consumer electronics devices in a home entertainment or information retrieval system.

Figure 14B:
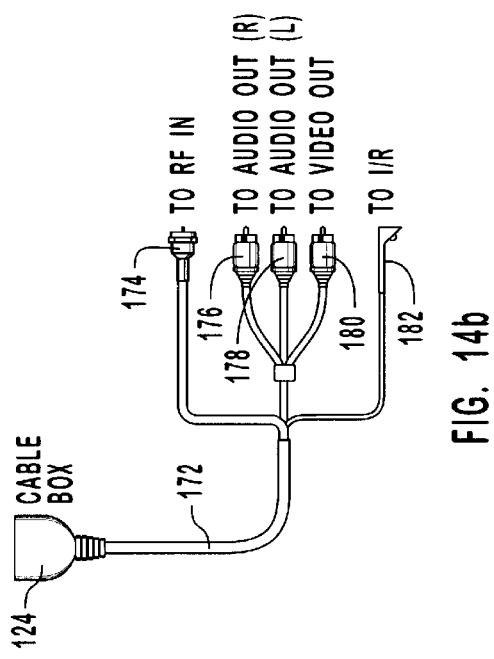
FIGS. 14A and 14B represent cables to connect to various cable boxes.
Figure 14A:
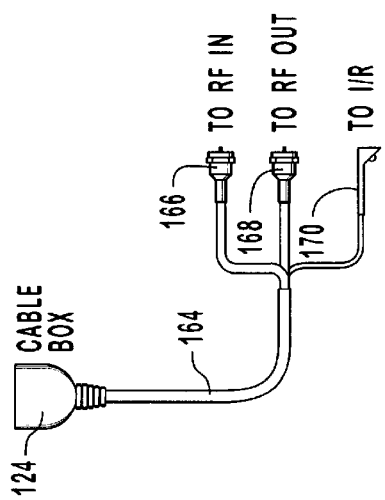

FIGS. 14A and 14B illustrate two exemplary cables which can connect the Internet terminal to a cable box. Referring first to FIG. 14A, cable 164 has at one end an appropriately labeled connector 124 adapted to connect to any of the identical, interchangeable connectors of the Internet terminal. Cable 164 is adapted to attach to a cable box that has an RF input and RF output connector. In addition, most cable boxes use a remote control to tune the cable box to the appropriate channel. Thus, cable 164 has connector 166 to attach to the RF input, connector 168 to attach to the RF output, and IR connector 170 to transmit IR signals to the cable box in order to change the channel of the cable box or access other functions of the cable box via the remote control of the Internet terminal. IR connector 170 may be an IR emitter assembly such as that illustrated by IR emitter assembly 96 of FIG. 6.

Because some and, occasionally, all of the channels provided by a cable company are scrambled, it may be desirable to provide both an RF input and RF output to a cable box. In this manner, the cable box can be used to descramble any scrambled channels. Thus, when the cable box is tuned to a scrambled channel using IR connector 170 or other means, the RF output connector 168 will carry the appropriate descrambled channel, which may then be routed to the appropriate destination, as directed by the user. As an alternative, the descrambling circuitry may be incorporated into the Internet terminal. By employing suitable methods to prevent piracy so that only those channels which a user is legally entitled to receive are descrambled, it may not be necessary to use connector 168 or, perhaps, even employ a cable box.

Some more modern cable boxes provide audio and video line outputs. FIG. 14B illustrates a cable adapted to attach to such a cable box. In FIG. 14B cable 172 is provided with an appropriately labeled connector 124. On the other end, cable 172 is provided with connector 174 to be connected of the RF input of the cable box, connectors 176 and 178 to be connected to the right and left audio channel outputs of the cable box, connector 180 to be connected to the video output of the cable box, and IR connector 182. IR connector 182 may also be an IR emitter such as IR emitter assembly 96 of FIG. 6.

Figure 15:
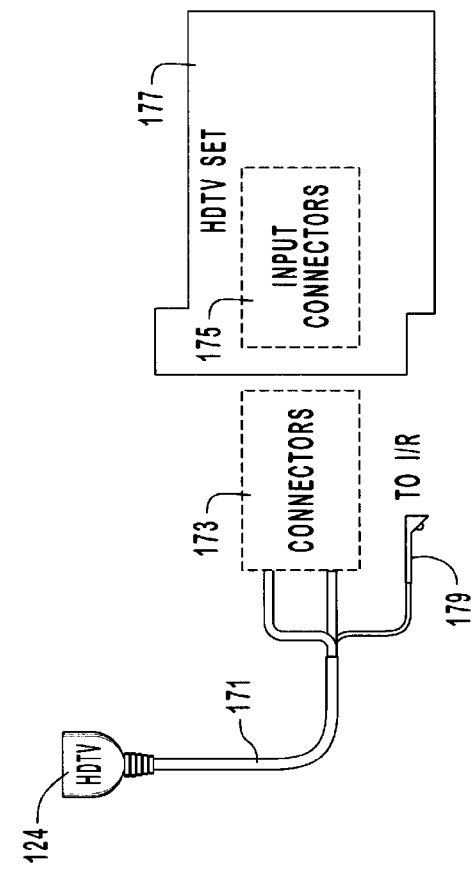
FIG. 15 depicts a cable to connect to a high definition television.

FIG. 15 illustrates a cable adapted to connect to a high definition television (HDTV) set. The specific structures of the connectors of the cable that connect to the HDTV set will depend largely on the HDTV standard or standards that will emerge over the coming years. The currently proposed video scanning formats for HDTV include 480P, 720P, and 1080I, where the numerical component indicates the number of vertical lines, while "P" indicates progressive scanning and "I" indicates interlaced scanning. Those skilled in the art, upon learning of the disclosure made herein, will understand how to configure cable 171 to these or any other HDTV format.

In principle, cable 171 performs many of the same functions as the other cables disclosed herein. For example, cable 171 is provided with appropriately labeled connector 124 which attaches to any of the identical, interchangeable connectors of the Internet terminal. On the other end, cable 171 is provided with connectors 173 to connect to the video and audio input connectors 175 of HDTV set 177. Cable 171 may also be provided with provided with IR connector 179, which may be an IR emitter such as IR emitter assembly 96 of FIG. 6.

Turning next to FIG. 16, a cable adapted to connect a satellite receiver to the Internet terminal is illustrated. Cable 184 is provided with appropriately labeled connector 124 which attaches to any of the identical, interchangeable connectors of the Internet terminal. On the other end, the cable is provided with S-video connector 186 to connect to the S-video output of the receiver. Cable 184 is also provided with connector 188 and 190 to connect to the right and left audio channel outputs of the receiver, respectively. Finally, cable 184 is provided with IR connector 192, which may be an IR emitter such as IR emitter assembly 96 of FIG. 6.

Recently, a new standard for interconnecting various types of consumer electronics devices has been proposed. This new standard is the IEEE 1394 standard. The standard is also sometimes referred to as FireWire, I-link, and Lynx. The IEEE 1394 standard supports a serial bus type structure that allows data transfer rates of up to 400 Mbps. Although it is anticipated that consumer electronics devices will soon begin appearing with IEEE 1394 connectors, a tremendous amount of legacy hardware currently exists and it is anticipated for the foreseeable future, consumer electronics devices adhering to the IEEE 1394 standard will also come configured with traditional connectors such as those illustrated in FIGS. 1–5. Thus, it is unclear at this point how quickly the IEEE 1394 standard will be adopted widespread enough to realize the benefits of the standard. It would, therefore, be important to be able to provide a mechanism to allow IEEE 1394 devices to coexist with legacy systems that do not adhere to the IEEE 1394 standard. The present invention can dramatically aid in the transition phase. As the IEEE 1394 devices become available, a user wishing to take advantage of the standard simply purchases a cable adapted to connect to the IEEE 1394 connector. Such an embodiment is illustrated in FIG. 17. In FIG. 17, cable 194 has on one end an appropriately labeled connector 124. On the other end, cable 194 has connector 196 which is adapted to connect to an IEEE 1394 connector. Operation of this cable is identical to the others in that connector 124 is adapted to be connected to any of the identical, interchangeable connectors on the Internet terminal. By using this mechanism, IEEE 1394 devices may be connected into devices using legacy systems that do not adhere to the IEEE 1394 standard. Thus, the present invention provides a convenient migration path from legacy systems to the IEEE 1394 standard. Such an approach also obviates the need to include legacy connectors on the consumer electronics devices that adhere to the IEEE 1394 standard.

The cables illustrated in FIGS. 12A–17 are representative of the various cables that may be developed according to the present invention. However the illustrated cables should not be construed to be limiting of the scope of the invention. In essence, for any particular device a cable can be constructed that has on one end a connector to connect to the identical, interchangeable connectors to the device. For example, in Europe, many television sets conform to the SCART standard with its particular connectors and signals. A cable that is compatible with a SCART television would have a SCART connector on one end and a connector 124 on the other.

Figure 18:
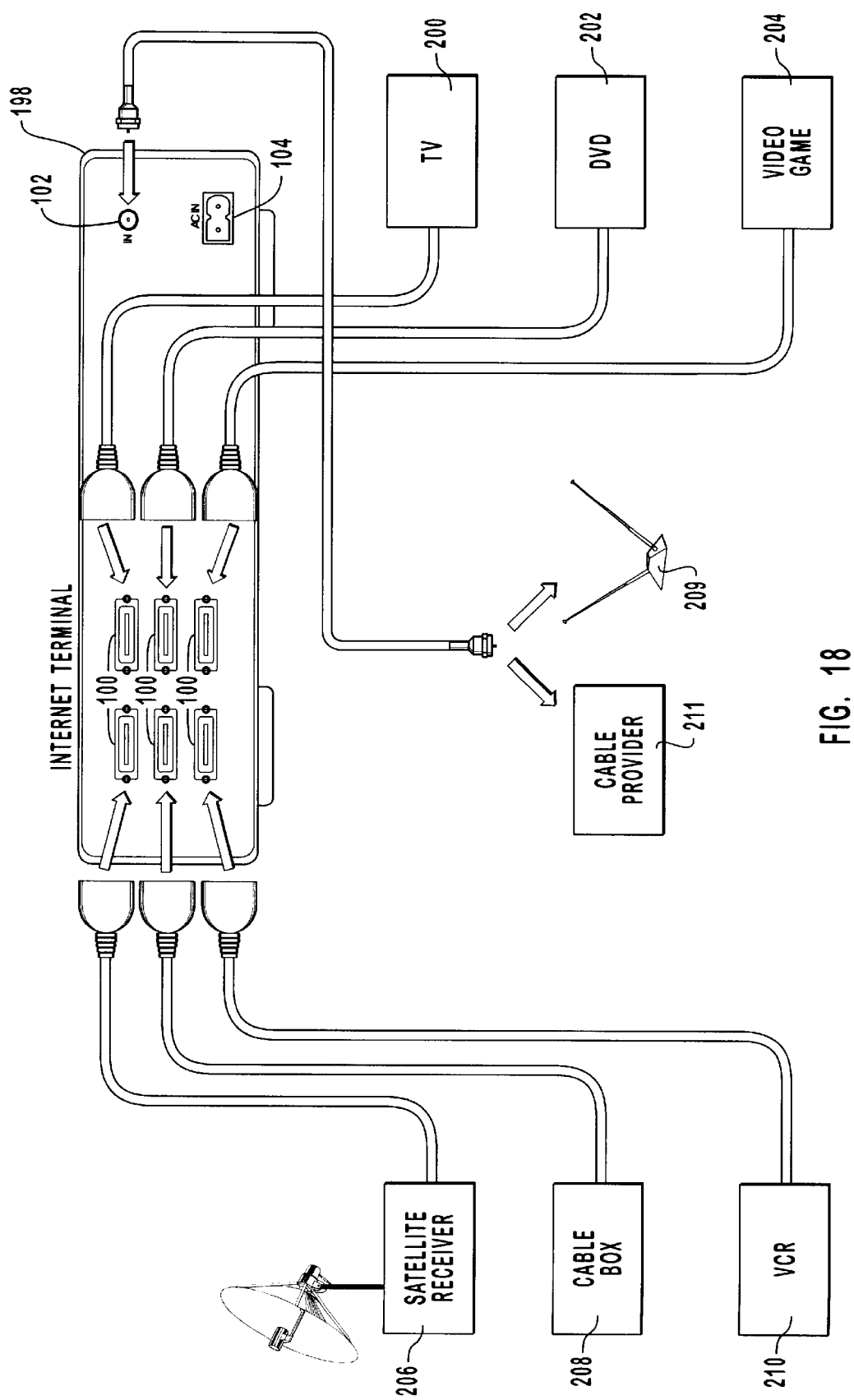
FIG. 18 illustrates a plurality of consumer electronics devices connected to a consumer electronics device according to the present invention.

Turning next to FIG. 18, an overview of the architecture of the Internet terminal connected to a plurality of consumer electronics devices is illustrated. FIG. 14 illustrates Internet terminal 198 as forming a central hub for the various consumer electronics devices. As previously discussed, the consumer electronics devices may comprise a wide variety of devices. As representative consumer electronics devices, FIG. 18 illustrates television 200, video disk player 202, video game machine 204, satellite receiver 206, cable box 208, and VCR 210. All of these consumer electronics devices are connected to one of the plurality of identical, interchangeable connectors 100 of Internet terminal 198. Each consumer electronics device will use an appropriate cable, such as those illustrated in FIGS. 12A–17.

By connecting each consumer electronics device to the Internet terminal, a dramatic simplification of the cabling, both physically and electrically, can be realized. As previously described, the input signal from an antenna 209 or cable system 211 is connected to input connector 102 of the Internet terminal. As more fully illustrated below, such an input signal may be commonly connected on one of the plurality of pins of each of the identical, interchangeable connectors 100. In this way, the input video signal can be directed to any particular consumer electronics device that requires it without the need to daisy chain the input signal through a variety of consumer electronics devices. For example, in FIG. 18 the input video signal supplied to connector 102 may also be commonly supplied to television 200, cable box 208, and VCR 210. Each of these devices thus may receive the input signal without daisy chaining the input signal through the various consumer electronics devices. In addition, the number of cables used to connect the various consumer electronics devices has been dramatically reduced. Each device still receives the number of conductors required to fully take advantage of its features, but the number of cables required is reduced. Furthermore, because a consumer does not need to determine which connector to plug a particular cable into on the Internet terminal, a dramatic simplification of the connection is realized.

FIG. 18 illustrates another benefit of the present invention. Because each consumer electronics device is connected to the Internet terminal in a hub and spoke arrangement, adding changing or removing consumer electronics devices is very easy. To remove a device, the cable is simply disconnected from the Internet terminal. No other changes to existing cables or consumer electronics devices need to be made. When a device is added, the cable for the device is connected to the Internet terminal. No other changes need to be made. This contrasts with current systems, such as that illustrated in FIG. 5 which would require significant changes to the existing configuration if, for example, the VCR was removed.

Because the cable from any consumer electronics device may be plugged into any one of the identical, interchangeable connectors of the Internet terminal, mechanisms must be put in place to ensure that the appropriate signals are directed to the appropriate consumer electronics device. This may be accomplished in a variety of ways. For example, if a sufficient number of connector pins exist, each of the connectors may be configured so as to provide various signals on various pins such that when a particular cable is connected to the connector, the electrical connections are made only to those signals necessary for that particular consumer electronics device. As yet another example, some configuration of the connector pins may occur when a cable is attached to the connector. In this method, when a cable is attached to the connector, the system senses the particular type of cable that has been attached and configures the pins on the connector to carry the appropriate signals for that particular cable. In such an embodiment, the system would to have means for sensing which of a plurality of different cable types have been connected and means for selecting the electrical signals carried on at least one of a plurality of pins in order to match the electrical signals with the particular cable type attached to the connector.

The present invention also realizes another cost savings. Since each hole that is made in the chassis of a consumer electronics device costs money, if the number of holes made in the consumer electronics device is reduced, then a savings may be realized. In the traditional cabling mechanisms, connectors had to be placed in the chassis for the myriad of differing devices and connection schemes that could potentially exist in any configuration. Thus, once the consumer electronics device is actually installed, a relatively few number of connectors may actually be used. In the present invention, however, any, consumer electronics device may be attached to any of the identical, interchangeable connectors. Thus, the system only need contain a connector for each consumer electronics device that might potentially be connected. In other words, the factor that determines how many connectors are placed on a system is not the myriad of possible configurations that a system may be used in but, rather, the number of other consumer electronics devices that may need to be connected to the system. Many consumers have relatively few other consumer electronics devices. Thus, consumers may only have a television, a VCR, and, perhaps, a cable box. In the vast majority of the cases, then, three connectors will typically be sufficient. Upgraded systems having more connectors may also be produced and marketed to those individuals having a larger number of consumer electronics devices.

The present invention may be embodied in other specific forms without departing from its spirit or essential characteristics. The described embodiments are to be, considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system including a display screen and a plurality of consumer electronics devices, at least one of which is to be connected to the display screen, a method for connecting two or more of said plurality of consumer electronics devices comprising the steps of:

receiving, at a first consumer electronics device, input from a user, said input identifying at least one other consumer electronics device that is to be connected to said first consumer electronics device;

displaying, on said display screen, information instructing said user bow to connect said at least one other consumer electronics device to said first consumer electronics device, said first consumer electronics device also being connected to said display screen;

connecting said at least one other consumer electronics device to said first consumer electronics device according to said information;

prior to the step of displaying said information, identifying, by said first consumer electronics device, a cable to be used to connect said at least one other consumer electronics device to said first consumer electronics device;

recognizing, by said first consumer electronics device, that said user has not obtained said cable; and initiating, by said first consumer electronics device, an electronic request to a remote site to purchase said cable.

2. A method as defined in claim 1, wherein the step of recognizing that said user has not obtained said cable comprises the step of determining that said cable is not included in a list of standard cables that are sold with said first consumer electronics device.

3. A method as defined in claim 2, wherein the step of recognizing that said user has not obtained said cable comprises the step of receiving, at said first consumer electronics device, user input indicating that said user has not obtained said cable.

4. A computer program product for implementing a method of instructing a user of an entertainment system how to connect a plurality of consumer electronics devices, wherein said method is implemented in said entertainment system, said entertainment system including a display screen and a first consumer electronics device connected to said display screen, the computer program product comprising:

a computer-readable medium carrying computer-executable instructions for implementing said method, wherein said computer-executable instructions comprise:

program code means for receiving input from a user, said input identifying at least one other consumer electronics device to be connected to said first consumer electronics device;

program code means for displaying, on said display screen, instructions describing an appropriate configuration for connecting said at least one other consumer electronics device to said first consumer electronics device;

program code means for determining whether said user has obtained a cable to be used for connecting said at least one other consumer electronics device with said first consumer electronics device; and program code means for initiating an electronic request to a remote site to purchase said cable if said program code means for determining whether said user has obtained said cable determines that said user has not obtained said cable.

5. A computer program product as defined in claim 4, wherein said program code means for determining whether said user has obtained said cable comprises program code means for determining whether said cable is included in a list of standard cables that are sold with said first consumer electronics device.

6. A computer program product as defined in claim 4, wherein said program code means for determining whether said user has obtained said cable comprises program code means for determining whether input has been received indicating whether said user his obtained said cable.

\* \* \* \* \*